(12) United States Patent
Song et al.

(10) Patent No.: US 8,046,454 B2
(45) Date of Patent: Oct. 25, 2011

(54) IDENTIFYING AND RECOMMENDING POTENTIAL COMMUNICATION STATES BASED ON PATTERNS OF USE

(75) Inventors: Yu Song, Pleasanton, CA (US); Swaroop Kalasapur, Sunnyvale, CA (US); Doreen Cheng, San Jose, CA (US); Sangoh Jeong, Palo Alto, CA (US)

(73) Assignee: Samsung Electronics Co. Ltd., Suwon (KR)

( * ) Notice: Subject to any disclaimer, the term of this patent is extended or adjusted under 35 U.S.C. 154(b) by 460 days.

(21) Appl. No.: 12/106,237

(22) Filed: Apr. 18, 2008

(65) Prior Publication Data

US 2009/0055523 A1 Feb. 26, 2009

Related U.S. Application Data

(63) Continuation-in-part of application No. 12/106,163, filed on Apr. 18, 2008, and a continuation-in-part of application No. 12/041,389, filed on Mar. 3, 2008.

(60) Provisional application No. 60/965,963, filed on Aug. 22, 2007, provisional application No. 60/978,637, filed on Oct. 9, 2007, provisional application No. 60/981,812, filed on Oct. 22, 2007.

(51) Int. Cl.
*G06F 15/16* (2006.01)
*G06F 15/173* (2006.01)
*G06F 15/177* (2006.01)

(52) U.S. Cl. .............................. 709/224; 706/17; 706/46

(58) Field of Classification Search .......... 709/217–228; 706/17, 46
See application file for complete search history.

(56) References Cited

U.S. PATENT DOCUMENTS

| 7,606,772 | B2 * | 10/2009 | Flinn et al. ...................... 706/12 |
| 2002/0174025 | A1 | 11/2002 | Hind et al. |
| 2004/0068627 | A1 | 4/2004 | Sechrest et al. |
| 2006/0271618 | A1 | 11/2006 | Kokubo et al. |
| 2008/0022001 | A1 * | 1/2008 | Godavarti et al. ............ 709/228 |
| 2008/0250316 | A1 * | 10/2008 | Zhang et al. .................. 715/708 |
| 2009/0049514 | A1 * | 2/2009 | Yan et al. .......................... 726/1 |

OTHER PUBLICATIONS

Ghahramani et al., "Probabilistic models for Unsupervised Learning," NIPS Tutorial, Gatsby Computational Neuroscience Unit, University College London, Dec. 1999, p. 1.

(Continued)

*Primary Examiner* — Haresh N Patel
(74) *Attorney, Agent, or Firm* — Beyer Law Group LLP

(57) ABSTRACT

Techniques for identifying potential communication uses of various systems are disclosed. Identifying potential communication uses of a computing system can improve the manner in which the computing system is used by allowing more intelligent decisions and better choices to be made regarding its communication use. By way of example, communication applications (or tasks or services) that are likely (or more likely) to be used by a person in a particular situation can be identified as potential communication use of a particular device. Such potential uses can, for example, be made more assessable (or more readily available) and/or effectively recommended (or automatically initiated), thereby allowing a person to more conveniently use the device. By way of example, identifying communication applications or tasks that are likely to be used by a person in a particular situation for various reasons (e.g., preferences and/or habits of a person in a particular situation) as potential communication use of a system (e.g., computing and/or communication device) allows making the communications applications, tasks, or services more assessable and/or effectively recommending them for use in a particular situation.

33 Claims, 23 Drawing Sheets

OTHER PUBLICATIONS

Kleek et al., "Getting to Know You Gradually; Personal Lifetime User Modeling (PLUM)", a poster at CHI 2007, 4 pages, Dec. 31.

Yu et al., "Context-Aware Media Personalization", ICOST 2006, pp. 359-362, IOS Press, Untied Kingdom, Dec. 31.

Dornbush et al., "Xpod—A human activity and emotion aware mobile music player," University of Maryland Baltimore County, United States, Nov. 2005, p. 1.

Raento et al., "ContextPhone: A prototyping Platform for Context-Aware Mobile applications," IEEE Pervasive computing, 2005, 9 pages, Dec. 31.

Yu et al., "Supporting Context-Aware Media Recommendations for Smart Phones," Pervasive computing, IEEE, vol. 5, Issue 3, Jul.-Sep. 2006, p. 68-75.

Dustdar et al., "A Survey on context-aware systems," Int. J. Ad Hoc and Ubiquitous Computing, vol. 2, No. 4, 2007, 15 pages, Dec. 31.

Fried, "Nokia to include Windows Live services," CNET News.com, Aug. 22, 2007, http://news.cnet.com/nokia-to-include-windows-live-services/2100-1039-6204013.html?part=dht&tag, 1 page.

Schmidt, et al., "Context-Phonebook—Extending Mobile Phone Applications with Context", MobileHCI workshop, 2001, 6 pages, Dec. 31.

U.S. Appl. No. 12/041,389, filed Mar. 3, 2008.

U.S. Appl. No. 12/106,163, filed Apr. 18, 2008.

Chen et al., "A Survey of Context-Aware Mobile Computing Research," Dartmouth Computer Science Technical Report TR2000-381, Dartmouth College, 2000, Dec. 31, p. 1.

Office Action dated Feb. 10, 2011 from U.S. Appl. No. 12/041,389, pp. 1-31.

Office Action dated Apr. 5, 2011 from U.S. Appl. No. 12/106,163, pp. 1-38.

Hofte, et al., "Context-aware communication with Live Contacts", https://doc.telin.nl/dscgi/ds.py/Get/File-42930/Context-aware_communication_with_Live_Contacts.pdf, 3 pages, Oct. 6, 2004.

Berstein et al., "Management of Personal Information Scraps," CHI 2007, Apr. 28-May 3, 2007, 6 pages.

Marmasse et al., "WatchMe: communication and awareness between members of a closely-knit group", http://ttt.media.mit.edu/research/WM_ubi04.pdf, 18 pages, In: Ubicomp, vol. 3205 Springer (2004), pp. 214-231, Dec. 31.

Dornbush et al., "Xpod—A human activity and emotion aware mobile music player," Proceedings of the Workshop on Ambient Intelligence, 20th International Joint Conference on Artificial Intelligence (IJCAI-2007), Jan. 8, 2007, 6 pages.

Notice of Allowance dated Jun. 17, 2011 from U.S. Appl. No. 12/106,163, pp. 1-10.

Final Office Action dated Jun. 23, 2011 from U.S. Appl. No. 12/041,389, pp. 1-35.

* cited by examiner

IDENTIFYING AND RECOMMENDING POTENTIAL COMMUNICATION STATES BASED ON PATTERNS OF USE

CROSS-REFERENCE TO RELATED APPLICATION

This application claims priority under 35 U.S.C. §119(e) from U.S. Provisional Patent Application No. 60/965,963, filed on Aug. 22, 2007, which is hereby incorporated herein by reference in its entirety and for all purposes.

This application claims priority under 35 U.S.C. §119(e) from U.S. Provisional Patent Application No. 60/978,637, filed on Oct. 9, 2007, which is hereby incorporated herein by reference in its entirety and for all purposes.

This application also claims priority under 35 U.S.C. §119 (e) from U.S. Provisional Patent Application No. 60/981,812, filed on Oct. 22, 2007, which is hereby incorporated herein by reference in its entirety and for all purposes.

This application is a continuation-in-part of and claims priority to commonly owned and now co-pending U.S. application Ser. No. 12/041,389, entitled "DETERMINING SITUATIONAL PATTERNS OF USE FOR COMPUTING SYSTEMS," filed on Mar. 3, 2008, which is hereby incorporated herein by reference in its entirety and for all purposes.

This application is a continuation-in-part of and claims priority to commonly owned and now co-pending U.S. application Ser. No. 12/106,163, entitled "IDENTIFYING AND RECOMMENDING POTENTIAL USES OF COMPUTING SYSTEMS BASED ON THEIR PATTERNS OF USE," filed on Apr. 18, 2008, which is hereby incorporated herein by reference in its entirety and for all purposes.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known and an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to relatively inexpensive microprocessors or computer chips provided, for example, in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as the telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred to where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mal. Its main standardization effort is done by 3GPP, 3GPP2 and Ope Mobile Alliance (OMA).

The popularity of computing systems, especially mobile communication devices is evidenced by their ever increasing use in everyday life. Accordingly, techniques that can enhance computing systems and/or their use would be very useful.

SUMMARY OF THE INVENTION

Broadly speaking, the invention relates to technique for improving communication systems and their use. More particularly, the invention pertains to techniques for identifying potential communication uses of computing systems.

It will be appreciated that identifying potential communication uses of a computing system, among other things, can improve the manner in which the computing system is used by allowing more intelligent decisions and better choices to be made regarding its communication use. By way of example, communication applications (or tasks or services) that are likely (or more likely) to be used by a person in a particular situation can be identified as potential communication use of a particular device. Such potential uses can, for example, be made more assessable (or more readily available) and/or effectively recommended (or automatically initiated), thereby allowing a person to more conveniently use the device. By way of example, identifying communication applications or tasks that are likely to be used by a person in a particular situation for various reasons (e.g., preferences and/or habits of a person in a particular situation) as potential communication use of a system (e.g., computing and/or communication device) allows making the communications applications, tasks, or services more assessable and/or effectively recommending them for use in a particular situation.

In accordance with one aspect of the invention, a potential communication use of a computing system can be identified by considering the context that effectively represents a particular situation for the computing system, and further considering at least one known situation as a match for that situation ("a matching situation"). A known situation can, for example, be associated with a known communication state of use of the computing system associated with a particular situation. As such, a potential communication state of use of a computing system can be identified based on one or more known communication states of use associated with one or more matching situations that are considered to be a match for a particular situation.

By way of example, the current context of a computing system can be determined at a given time as a current situation for the computing system and effectively compared with one or more known situations that are respectively associated with one or more known communication states of use of the computing system in accordance with one embodiment of the invention. Then, at least one of the known situations can be identified as a "matching situation" for the current situation. Generally, a matching situation can be associated with a corresponding known communication state of use of the computing system. As such, a potential communication state of use can be identified based one or more corresponding known communication states of use associated with one or more situations that are considered to be a match for the current situation (one or more matching situations).

Identifying a potential communication state of use, among other things, allows devices to effectively negotiate a mutually acceptable communication state given their respective situation in accordance with another aspect of the invention. In addition, various communication applications, tasks and/ or services can be recommended and/or made more accessible (or more readily accessible) in various situations so that at any given situation communication can take place in a convenient, mutually preferred and/or appropriate manner. As a result, communication systems and the manner in which they can communicate can be enhanced. In particular, the ability to determine the preferred or suitable communication states in different situations can dramatically improve mobile communication device and allow for a much better user experience.

In accordance with another aspect of the invention, a match for a situation ("matching situation") can be determined based on (a) situational pattern of use data and/or (b) integrated state and contextual usage data. It will be appreciated that (a) situational pattern of use data and/or (b) integrated state and contextual usage data can be used to generate situational pattern of use data. Generally, a situational pattern of use can be determined based on the situations encountered by the computing system as the situations occur without having to predefine a set of situations. Furthermore, a situation can be determined and/or defined based on the context of use of the computing system when or as the use occurs. The context of use can, for example, be determined based on one or more contextual variables and/or parameters including device internal and external variables such as, for example, the physical environment where a device is used and biological data associated with a person using the device. In addition to the context of use, a state of use can determined for the computing system. The state of use can, for example, be determined based on the state (or status) of one or more components of the computing system (e.g., the state of one or more active applications, tasks and/or services used or being used by person). Similar to the context of use, the state of use can be determined as the use occurs without having to pre-define potential uses of the computing system (e.g., there is no need to predefine or know the applications that will be used on a device).

Moreover, the state of use can be effectively connected to (or associated with) the context of use defining a situation in which the state of use has occurred. This allows determining a pattern of use of the computing system at least based on the association of the state of use with a situation effectively defined (or represented) by the contextual usage data which can be obtained when and as the use occurs. In other words, the state of use of the computing system (e.g., the state of one or more applications, tasks and/or services being used, such as, for example, the state of a word processor) can be determined and connected to the context of the use (e.g., contextual variables such as, for example, temperature, physical location, heart beat of the person using the device). Generally, a state of use can be defined as simply as desired (e.g., application active or not) or it can be defined using very complex variables to provide as much information about the state of use as desired, as will be readily appreciated by those skilled in the art. For example, a state of use can include additional information pertaining to the state of use and/or manner of use (e.g., information pertaining to the use of one or more applications and/or tasks, such as, for example, parameters used to initiate an application, how long an application has been open and what files it has opened, what number has been called and the duration of each call made by an communication application, input/output parameters such as pressure and speed provided in connection with an application).

It should be noted that a situation can also be defined based on the state (or status) of one or more usable components of the computing systems (e.g., one or more applications and/or tasks). In other words, the state of use of one or more usable components (e.g., one or more designated applications) can also be considered in addition to other contextual variables (e.g., temperature) in defining a situation. As such, one or more usable components can be effectively defined as context of use (or a part of the context of use), for example, for one or more other usable components. By way of example, the state of use of a first group of applications can be used as context variables combined with other context variables (e.g., environmental variables) in order to define a situation for a second group of applications (i.e., define a situation associated with state of use of the second group of applications).

The invention can be implemented in numerous ways, including, for example, a method, an apparatus, a computer readable medium, and a computing and/or communication system (e.g., a mobile phone). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
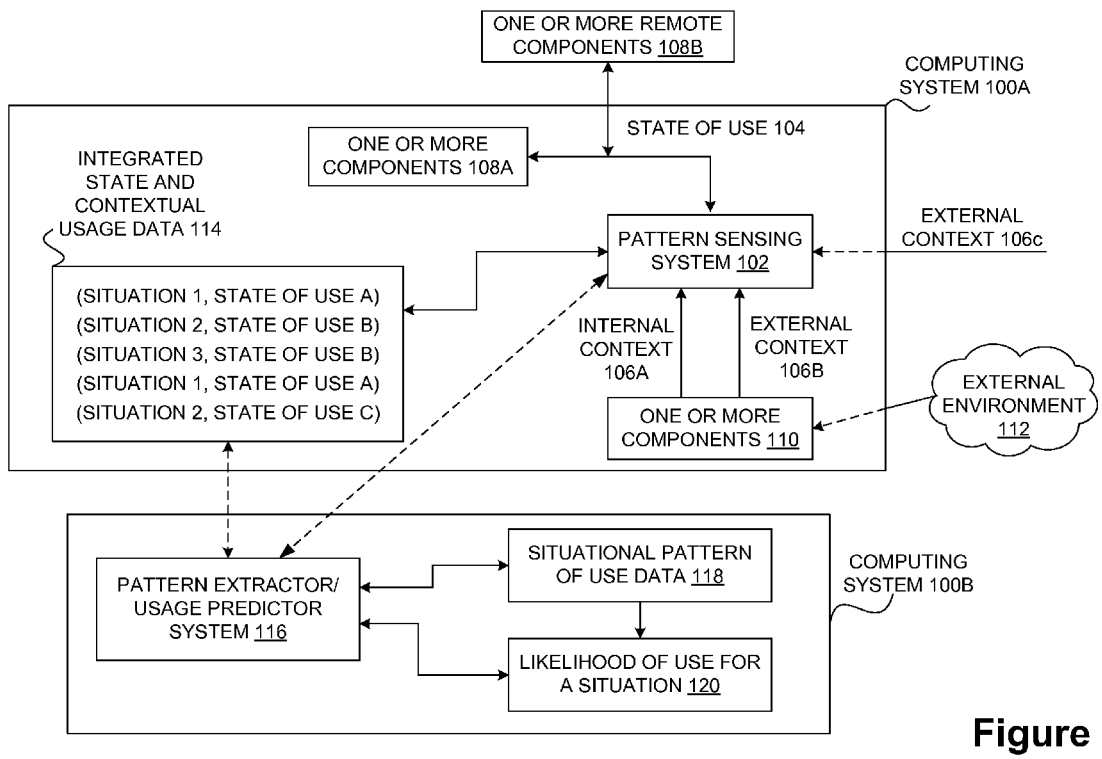
FIG. 1A depicts computing systems in accordance with various embodiments of the invention.

As noted in the background section, mobile computing devices have become increasing more popular in recent years. Today, wireless, mobile, and/or portable communication devices (e.g., Smartphones, cell phones, Personal Digital Assistants) are especially popular. In recent years, mobile devices have evolved to provide increasingly more functions. As such, wireless and/or mobile communication devices (e.g., cell phones, SmartpPhones) are available today which can offer functionality traditionally offered by Personal Computers (PCs).

Despite these advances, mobile (or portable) devices still need to work with relatively smaller input/output devices (e.g., displays, screens, keyboards). As such, the enhanced processing power and functionality provided by the newer mobile devices has ironically resulted in frustrating some individuals as it has become increasingly more difficult to navigate through numerous applications, functions, menus and services. As a result, extensive efforts have been made by a number of entities to develop alternative techniques for interacting with mobile devices.

One approach is to allow the users to set their preferences individually. However, this approach does not fully realize that preferences may vary from one situation to the next. For example, an individual may have a different set of preferences at home than those preferred at the office. Also, the same individual may have an entirely different set of preferences for using a mobile device on: a cold raining day as opposed to a worm sunny day, an unusual weekday at home versus a regular weekday at work, or an occasional Saturday at work, and so on.

Other approaches require the user to effectively train the device over a period of time ("supervised training"). However, supervised training may not be an ideal or a desired solution for many applications as it generally requires a person to spend a significant amount of time and effort to actively train the device as the device is being used. Another drawback is that conventional approaches are not flexible or do not readily adapt to changes in preferences, environments, or habits associated with the use of the device. Therefore, improved techniques for enhancing mobile devices and/or their use are needed. More generally, techniques the can generally enhance computing systems and/or their use would be very useful. More generally, techniques the can generally enhance systems and/or their communication use would be very useful.

Accordingly, the invention provides techniques for identifying potential communication uses of computing systems. It will be appreciated that identifying potential communication uses of a computing system, among other things, can improve the manner in which the computing system is used by allowing more intelligent decisions and better choices to be made regarding its communication use. By way of example, communication applications (or tasks or services) that are likely (or more likely) to be used by a person in a particular situation can be identified as potential communication use of a particular device. Such potential uses can, for example, be made more accessible (or more readily available) and/or effectively recommended (or automatically initiated), thereby allowing a person to more conveniently use the device. By way of example, identifying communication applications or tasks that are likely to be used by a person in a particular situation for various reasons (e.g., preferences and/or habits of a person in a particular situation) as potential communication use of a system (e.g., computing and/or communication device) allows making the communications applications, tasks, or services more assessable and/or effectively recommending them for use in a particular situation.

In accordance with one aspect of the invention, a potential use of a computing system can be identified by considering the context that effectively represents a particular situation for the computing system, and further considering at least one known situation as a match for that situation ("a matching situation"). A match need not necessarily be an exact match but can, for example, represent a situation that is considered to be similar. A match can merely be a situation that is known and identified based on one or more criteria. A known situation can, for example, be associated with a known state of use of the computing system associated with a particular situation. As such, a potential state of use of a computing system can be identified based on one or more known states of use associated with one or more matching situations that are considered to be a match for a particular situation.

By way of example, the current context of a computing system can be determined at a given time as a current situation for the computing system and effectively compared with one or more known situations that are respectively associated with one or more known communication states of use of the computing system in accordance with one embodiment of the invention. Then, at least one of the known situations can be identified as a "matching situation" for the current situation. Generally, a matching situation can be associated with a corresponding known communication state of use of the computing system. As such, a potential communication state of use can be identified based on one or more corresponding known communication states of use associated with one or more situations that are considered to be a match for the current situation (one or more matching situations).

Identifying a potential communication state of use, among other things, allows devices to effectively negotiate a mutually acceptable communication state given their respective situation in accordance with another aspect of the invention. In addition, various communication applications, tasks and/or services can be recommended and/or made more accessible (or more readily accessible) in various situations so that at any given situation communication can take place in a convenient, mutually preferred and/or appropriate manner. As a result, communication systems and the manner in which they can communicate can be enhanced. In particular, the ability to determine the preferred or suitable communication states in different situations can dramatically improve mobile communication device and allow for a much better user experience.

In accordance with another aspect of the invention, a match for a situation ("matching situation") can be determined based on (a) situational pattern of use data and/or (b) integrated state and contextual usage data. It will be appreciated that (a) situational pattern of use data and/or (b) integrated state and contextual usage data can be used to generate situational pattern of use data. Generally, a situational pattern of use can be determined based on the situations encountered by the computing system as the situations occur without having to predefine a set of situations. Furthermore, a situation can be determined and/or defined based on the context of use of the computing system when or as the use occurs. The context of use can, for example, be determined based on one or more contextual variables and/or parameters including device internal and external variables such as, for example, the physical environment where a device is used and biological data associated with a person using the device. In addition to the context of use, a state of use can determined for the computing system. The state of use can, for example, be determined based on the state (or status) of one or more components of the computing system (e.g., the state of one or more active applications, tasks and/or services used or being used by person). Similar to the context of use, the state of use can be determined as the use occurs without having to predefine potential uses of the computing system (e.g., there is no need to predefine or know the applications that will be used on a device).

Moreover, the state of use can be effectively connected to (or associated with) the context of use defining a situation in which the state of use has occurred. This allows determining a pattern of use of the computing system at least based on the association of the state of use with a situation effectively defined (or represented) by the contextual usage data which can be obtained when and as the use occurs. In other words, the state of use of the computing system (e.g., the state of one or more applications, tasks and/or services being used, such as, for example, the state of a word processor) can be determined and connected to the context of the use (e.g., contextual variables such as, for example, temperature, physical location, heart beat of the person using the device). Generally, a state of use can be defined as simply as desired (e.g., application active or not) or it can be defined using very complex variables to provide as much information about the state of use as desired, as will be readily appreciated by those skilled in the art. For example, a state of use can include additional information pertaining to the state of use and/or manner of use (e.g., information pertaining to the use of one or more applications and/or tasks, such as, for example, parameters used to initiate an application, how long an application has been open and what files it has opened, what number has been called and the duration of each call made by an communication application, input/output parameters such as pressure and speed provided in connection with an application).

It should be noted that a situation can also be defined based on the state (or status) of one or more usable components of the computing systems (e.g., one or more applications and/or tasks). In other words, the state of use of one or more usable components (e.g., one or more designated applications) can also be considered in addition to other contextual variables (e.g., temperature) in defining a situation. As such, one or more usable components can be effectively defined as context of use (or a part of the context of use), for example, for one or more other usable components. By way of example, the state of use of a first group of applications can be used as context variables combined with other context variables (e.g., environmental variables) in order to define a situation for a second group of applications (i.e., define a situation associated with state of use of the second group of applications).

Embodiments of these aspects of the invention are discussed below with reference to FIGS. 1A-12B. However, those skilled in the art will readily appreciate that the detailed description given herein with respect to these figures is for explanatory purposes as the invention extends beyond these limited embodiments.

FIG. 1A depicts computing systems 100A and 100B in accordance with various embodiments of the invention. Those skilled in the art will appreciate that the computing systems 100A and/or 100B can, for example, be a computing device that includes one or more processors and memory (not shown). Referring to FIG. 1A, the computing system 100A effectively includes a pattern sensing system 102 adapted for and/or capable of obtaining a state (or status) of use 104 and contextual information (context) 106.

Typically, the state of use 104 is associated with and can be determined based on the state (or status) of one or more components 108 of the computing system 100A. The components 108 can include internal (108A) and remote (108B) components. The one or more components 108 can, for example, be one or more operational and/or executable components and/or usable components (e.g., one or more application programs being executed on the computing system 100A).

Similarly, the context 106 obtained by the pattern sensing system 102 can be associated and/or determined by or based on one or more components 110. As such, the component(s) 108 can be the same as the component(s) 110 or one or more different components. Generally, the pattern sensing system 102 obtains a context (e.g., a context of use) for the computing system 100A which can represent a situation for the computing system 100A. The context can be determined based on various internal and external factors including the state of use of one or components 108A. By way of example, the one or more components 110 can determine (e.g., measure) one or more factors, elements or variables associated with an external environment 112 and provide them to the pattern sensing system 102. As another example, internal context 106*a* representing the context of use of the computing system 100A may also be determined by and/or based on one or more components 108A and/or 110 and provided to the pattern sensing system 102. It should be noted that external context 106*c* can also be received, for example, directly from one or more other external components (not shown) and processed by the pattern sensing system 102. As such, the context of use of one or more components 108 and/or 110 and other context information 106 can both be considered by the pattern sensing system 102 in determining a situation.

In any case, the pattern sensing system 102 processes the state of use information 104 and contextual information 106 in order to generate integrated state and contextual usage data 114. It will be appreciated that the pattern sensing system 102 can effectively represent the contextual information 106 as the situation associated with the state of use 104. As such, the integrated state and contextual usage data 114 can effectively include a set of situations (e.g., situation 1, situation 2, and situation 3) with their respective (or associated) states of use (e.g., state of use A, state of use B, state of use C). By way of example, the integrated state and contextual usage data 114 can effectively indicate that in a first situation, (situation 1), the computing system 100A has been in a first state of use (state of use A), and so on. As a result, the integrated state and contextual usage data 114 allows determining a pattern of use for the computing system 100A based on the association of a state of use with a particular situation in which the state of use has been effectively observed.

More particularly, the pattern extractor/usage predictor system 116 can effectively obtain the integrated state and contextual usage data 114 in order to determine the situational pattern of use data 118 based on the association of the state of use and the situation in which the use has been observed. It will be appreciated that the pattern extractor/usage predictor system 116 can use the situational pattern of use data 118 for many applications. By way of example, the situational pattern of use data 118 can be used to determine the likelihood of use 120 of the computing system 100A for a particular situation. As such, the likelihood of use 120 can, for example, effectively indicate the probability of the computing system 100A being used in a particular situation (e.g., situation 2) in accordance with a particular state of use (e.g., state of use C).

Those skilled in the art will readily appreciate that the pattern sensing system 102 and pattern extractor/usage predictor system 116 can be combined and provided for a single computing system (e.g., a computing device). In other words, a single computing system can effectively determine the integrated state and contextual usage data 114 and use it to extract the situational pattern of use data 118 for a variety of applications including determining the likelihood of use 120. It should also be noted that the pattern sensing system 102 can be in communication with the pattern extractor/usage predictor system 116. As such, the pattern sensing system 102 can effectively communicate the integrated state and contextual usage data 114. In addition, the pattern extractor/usage predictor system 116 can effectively provide feedback to the pattern sensing system 102, for example, based on the situational pattern of use data 118 and/or the likelihood of use 120, in order to, for example, affect the information gathered by the pattern sensing system 102 including the state of use 104 and contextual information 106.

The pattern extractor/usage predictor system 116 can, for example, determine a pattern of use based on the frequency of occurrence of one or more states of use with respect to one or more situations. It will be appreciated that there is no need to provide the computing system 100A or 100B with supervised training in order to determine a pattern of use (e.g., pattern of use of the computing system 100A). Further, it will be appreciated that the situations effectively represented by the integrated state and contextual usage data 114 need not be predefined prior to their occurrence. In other words, situations can be defined as they occur. As such, the pattern of use data 118 can, for example, be used in a dynamic manner to define and/or affect the information being obtained. Similarly, states of use need not be predefined prior to their occurrence. As a result, the computing systems 100A and 100B can readily adapt to new uses (e.g., new applications) and situations, as well as a change in usage (e.g., a change with respect to applications that are frequently used, use of a device by a different user or a user with different habits) and/or change in situations associated with the use of the computing system (e.g., using a device that has been used in an office at home, moving to a different geographical location).

Figure 1B:
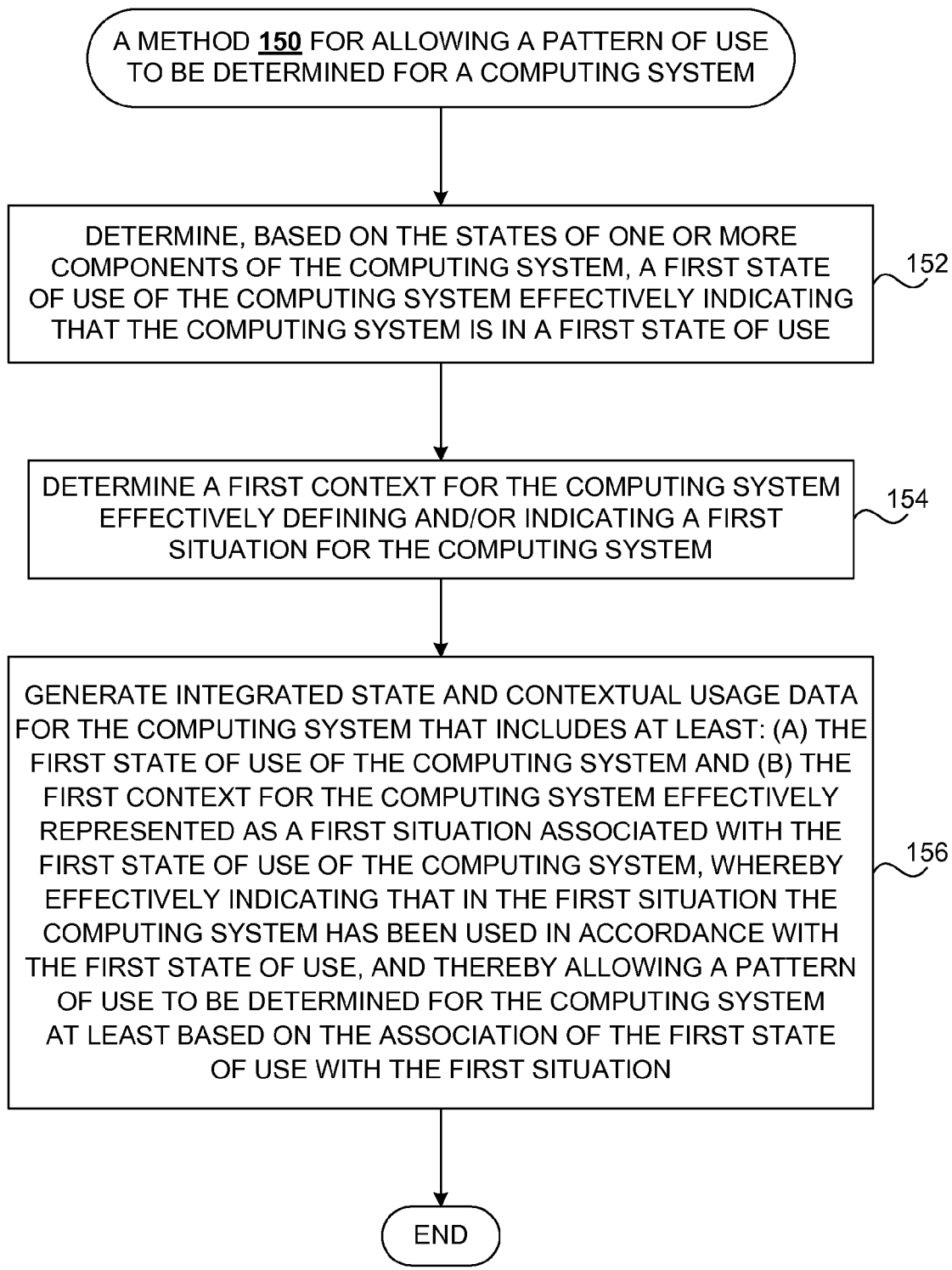
FIG. 1B depicts a method for allowing a pattern of use to be determined for a computing system in accordance with one embodiment of the invention.

FIG. 1B depicts a method 150 for allowing a pattern of use to be determined for a computing system in accordance with one embodiment of the invention. The method 150 can, for example, be performed by the computing system 100A depicted in FIG. 1A. Initially, a first state of use of the computing system is determined (152) based on the state of one or more components of the computing system. The first state of use of the computing system effectively indicates that the computing system is in a first state of use. Next, a first context for the computing system is determined (154). The first context effectively defines a first situation for the computing system. Thereafter, integrated state and contextual usage data for the computing system is generated (156). The integrated state and contextual usage data includes at least the first state of use and first context for the computing system represented as a first situation associated with the first state of use, whereby effectively indicating that in the first situation the computing system has been used in accordance with the first state of use. It will be appreciated that the integrated state and contextual usage data allows a pattern of use to be determined for the computing system at least based on the association of the first state of use with the first situation effectively represented by the first context. The method 150 ends after the integrated state and contextual usage data is generated (156).

Figure 1C:
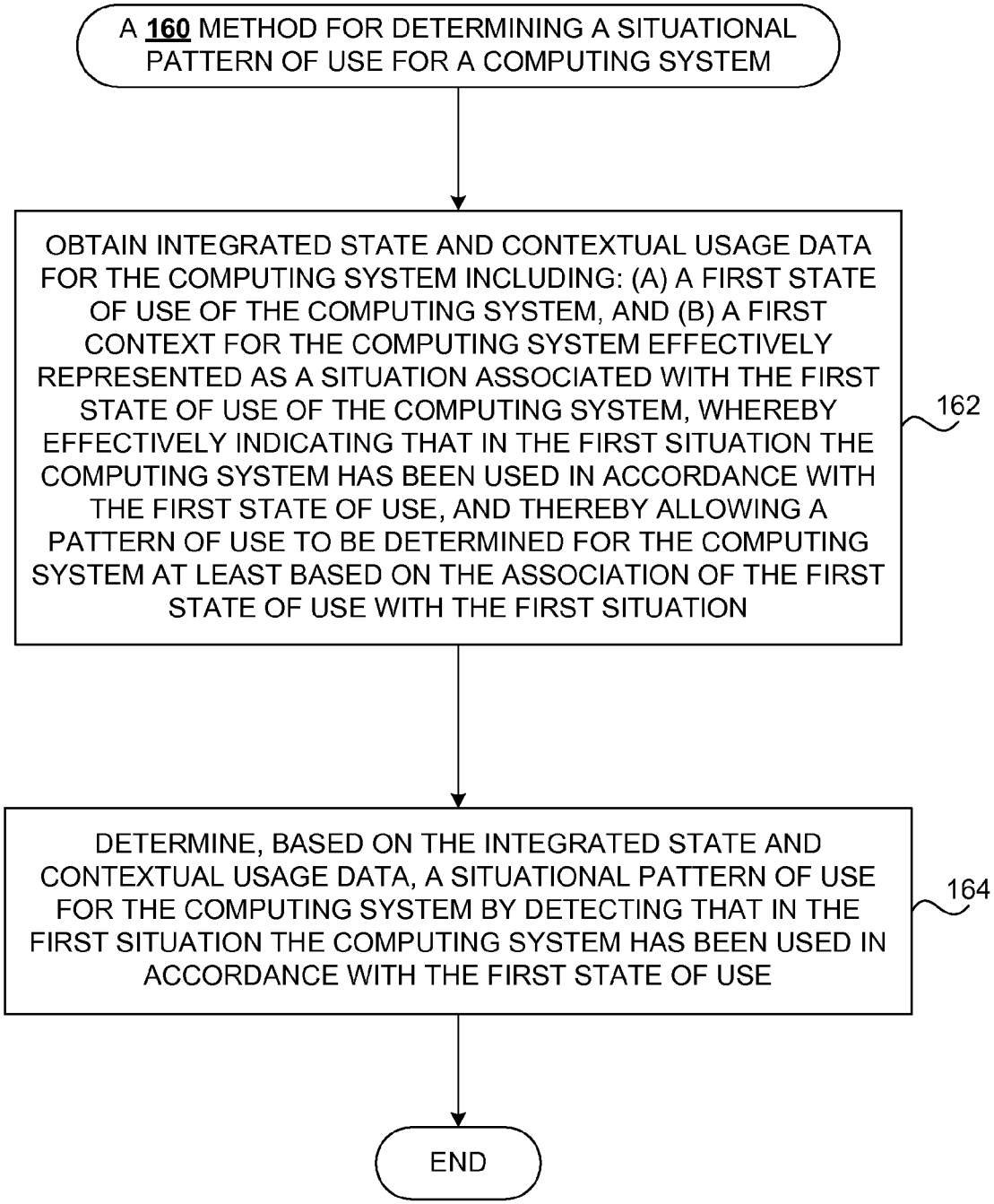
FIG. 1C depicts a method for determining a situational pattern of use for a computing system in accordance with one embodiment of the invention.

FIG. 1C depicts a method 160 for determining a situational pattern of use for a computing system in accordance with one embodiment of the invention. The method 160 can, for example, be performed by computing system 100B shown in FIG. 1A. Initially, integrated state and contextual usage data is obtained (162) for the computing system. The integrated state and contextual usage data includes a first state of use and a first context for the computing system. The first context is effectively represented as a first situation associated with the first state of use of the computing system, whereby effectively indicating that in the first situation, the computing system has been used in accordance with the first state of use. It will be appreciated that the integrated state and contextual usage data allows the pattern of use to be determined for the computing system at least based on the association of the first state of use with the first situation. Accordingly, a situational pattern of use is determined (162) based on the integrated state and contextual usage data by detecting that in the first situation the computing system has been used in accordance with the first state of use. The method 160 ends after the situational pattern of use has been determined (164).

Figure 2A:
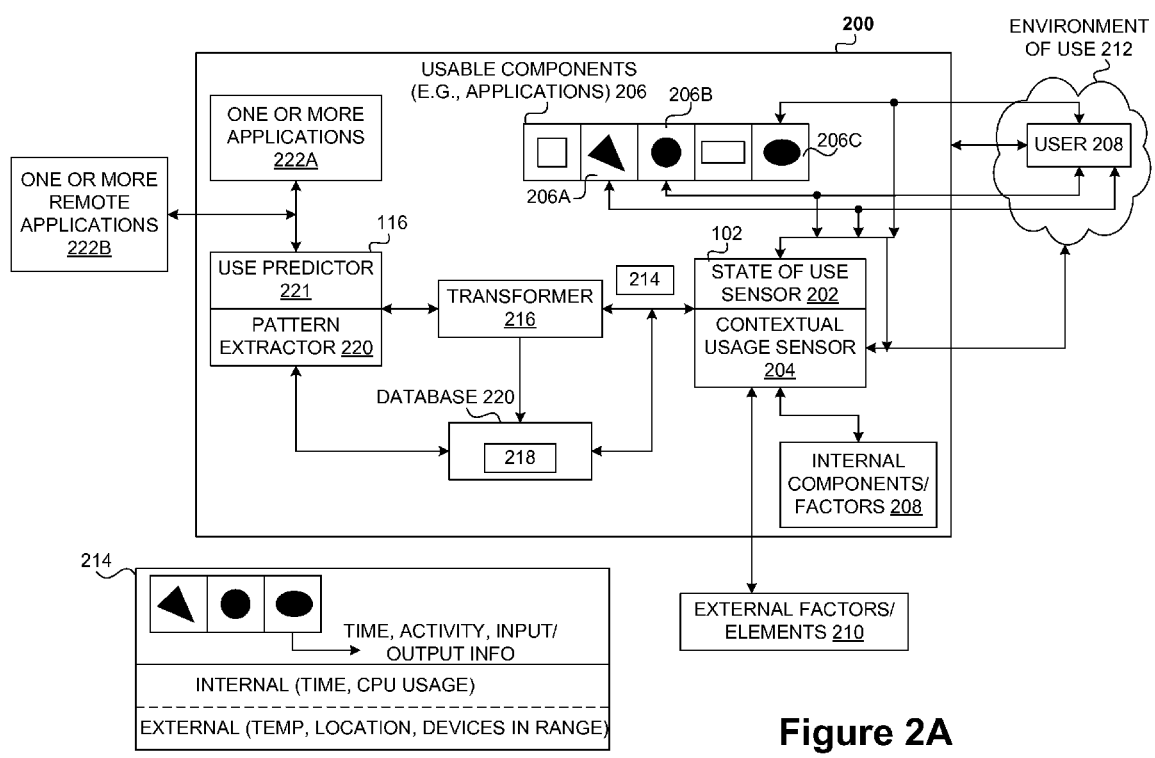
FIG. 2A depicts a computing system in greater detail in accordance with one embodiment of the invention.

As noted above, the pattern sensing system 102 and the pattern extractor/usage predictor system 116 can be effectively combined and provided by the same computing system. To further elaborate, FIG. 2A depicts a computing system 200 in greater detail in accordance with one embodiment of the invention. Referring to FIG. 2A, the computing system 200 effectively provides a pattern sensing system 102 and a pattern extractor/usage predictor 116. The pattern sensing system 102 includes the state of use sensor 202 and the contextual usage sensor 204. The state of use sensor 202 can effectively sense the state of use of one or more usable components 206 of the computing system 200. Generally, the one or more usable components 206 can be one or more hardware and/or software components of the computing system 200. By way of example, the usable components 206 can include one or more application programs that are being effectively used by a user 208 (e.g., one or more persons, one or more end-user application programs, one or more computing components or devices). As such, the state of use sensor 202 can, for example, sense the state of one or more usable components 206 which are active and being used by one or more persons 208 via one or more input/output devices (now shown). Referring to FIG. 2A, the state of use sensor 202 can effectively indicate that one or more usable components 206A, 206B and 206C are active and/or being actively used. In addition, the state of use sensor 202 can effectively indicate the manner in which the active usable components (206A, 206B and 206C) are being used by the user 208. By way of example, the state of use sensor 202 can, for example, indicate the duration of activity for a particular application and/or the manner in which input/output has been provided by the user 208 in connection with the active application, and so on.

Those skilled in the art will readily appreciate that the state of use effectively sensed by the state of use sensor 202 can, for example, include one or more of the following: state of one or more applications, state of active use of one or more applications, state of active use including one or more variables associated with the manner in which the one or more applications have been used, state of one or more applications supported on the computing system, state of one or more active applications that are being effectively used on the computing system, and state of one or more active applications that are being effectively used by one or more persons who effectively interact with the one or more active applications via one or more input/output devices.

The other component of the pattern sensing system 102, namely, the contextual usage sensor 204, can effectively determine the context of use of the computing system 200. In general, the context of use determined by the contextual usage sensor 204 can include internal and external components, elements, variables and/or factors 208 and 210, as well the context of use of one or more usable components 206 themselves. As such, the contextual usage sensor 204 can, for example, determine the context of use based on one or more internal components of the computing system (e.g., timers, drivers, software modules) or internal factors and/or elements (e.g., CPU usage, memory available). The contextual usage sensor 204 can also determine the context of use based on a set of external components, variables, factors and/or elements 210 which can include an environment of use 212. Generally, the combination of contextual factors and the usable components 206 can be used to effectively represent a situation for the computing system. By way of example, the status (or status of use) of one or more usable components 206 and various internal and/or external variables can be considered by the context usage sensor 204 in determining the context that effectively represents a situation for the computing system 200.

It will be appreciated that the environment of use 212 can, for example, represent the physical environment associated with one or more persons 208 who are interacting with the one or more active components 206A, 206B and 206C. The context of use can, for example, include one or more of the followings: an environmental factor and/or element, an environmental factor and/or element associated with one or more humans interacting with one or more active applications on said computing system, environmental context of use associated with an environment of one or more humans as they interact with one or more active applications on the computing system, a geographical and/or physical factor and/or element, time, date, location, mode, mode of operation, condition, event, speed and/or acceleration of movement, power and/or force, presence of one or more external components and/or devices, detection of more of more external devices in a determined proximity of said device, detection of one or more active components operating on one or more external devices in a determined proximity of the device, and one or more physiological and/or biological conditions associated with one or more persons interacting with the computing system.

As noted above, a situation can be determined also based on one or more usable components (e.g., one or more applications) that are supported, operational, active and/or being actively used. As such, the context of use can, for example, be determined based on one or more of the following: one or more usable components of a computing system, and one or more usable components of a computing system that are active and/or being used (e.g., one or more applications supported by said computing system, one or more applications of said computing system that are active and/or being used)

The state of use sensor 202 and contextual usage sensor 204 can effectively work together to provide integrated state and contextual usage data 214. Referring to FIG. 2A, the integrated state and contextual usage data 214 can, for example, indicate that a number of usable components are active and additionally provide the state of use for each of the active applications (e.g., a state for each active application). It should also be noted that the state of use can include a set of factors associated with the manner of use of one or more of the active usable components (e.g., time active, input/output data provided in connection with the active components).

In addition to the state of use, the integrated state and contextual usage data 214 provides the context in which the usable components are used. Referring to FIG. 2A, the context includes internal variables (e.g., time, CPU usage) as well as external variables associated with the environment of use 212 (e.g., temperature, location, device that are in range).

It should be noted that the integrated state and contextual usage data 214 can be effectively provided as input to a transformer 216 which transforms the data into a form which is readily available for a pattern extractor 220 which is provided as a part of the pattern extractor/usage predictor 116. The pattern extractor 220 can effectively extract one or more usage patterns as pattern of use data 218 which can be stored in a database 223. A use predictor 221 can effectively use the pattern of use data 218 in order to determine the likelihood of use of the computing system 200. It will be appreciated that the likelihood of use can be effectively provided to one or more internal or remote applications 222 in order to allow them to make certain predications about the use of the computing system 200.

Figure 2B:
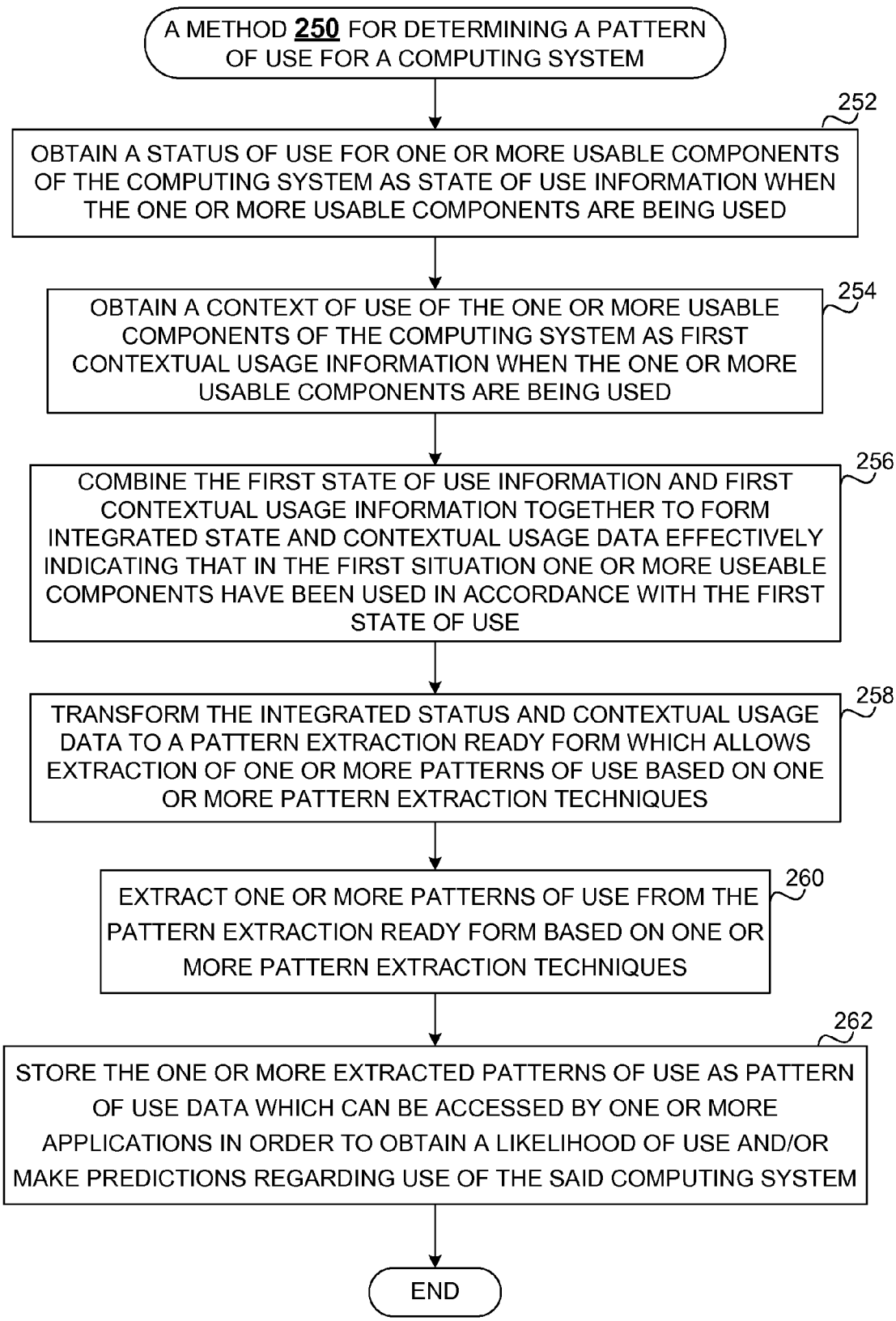
FIG. 2B depicts a method for determining a pattern of use of a computing system in accordance with one embodiment of the invention.

FIG. 2B depicts a method 250 for determining a pattern of use of a computing system in accordance with one embodiment of the invention. The method 250 can, for example, be used by the computing system 200 shown in FIG. 2A. Initially, the state of use for one or more usable components of the computing system is obtained (252) as state of use information when the one or more usable components are being used. In addition, the context of use of the one or more usable components is obtained (254) as first contextual usage information when the one or more usable components are being used. It should be noted that the first contextual usage information effectively defines and/or indicates a first situation in which the one or more usable components have been used. Next, the first state of usage information and the first contextual usage information are combined (256) together to form integrated state and contextual usage data. It will be appreciated that the integrated state and contextual usage data effectively indicates that in the first situation, one or more usable components have been used in accordance with the first state of use. Thereafter, the integrated state and contextual usage data is transformed (258) to a pattern extraction ready form which allows extraction of one or more patterns of use based on one or more pattern extraction techniques. Accordingly, one or more patterns of use are extracted (260) from the pattern extraction ready form based on one or more pattern extraction techniques. Finally, the one or more extracted patterns of use are stored (262) as pattern of use data. It will be appreciated that the pattern of use data can be accessed by one or more applications in order to obtain the likelihood of use and/or make predictions regarding use of the computing system.

Figure 3A:
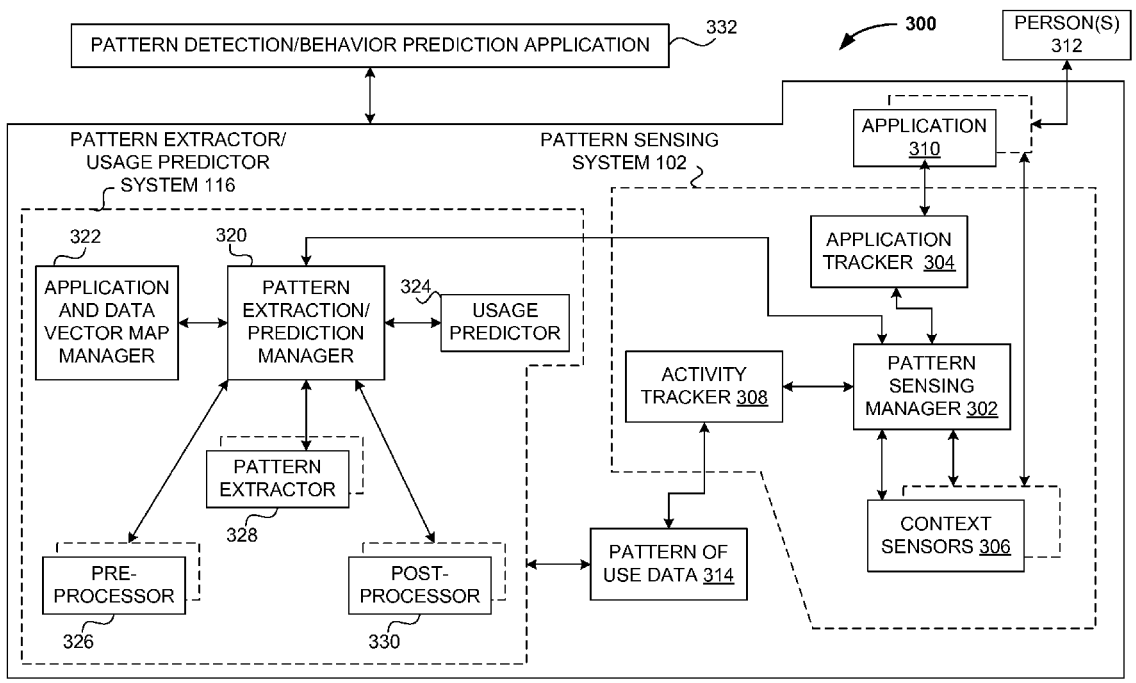
FIG. 3A depicts a computing system in accordance with another embodiment of the invention.

FIG. 3A depicts a computing system 300 in accordance with another embodiment of the invention. Referring to FIG. 3A, a pattern sensing system 102 and a pattern extractor/usage predictor system 116 are effectively provided by the computing system 300. More particularly, a pattern sensing manager 302 effectively manages pattern sensing activities of an application tracker 304, one or more context sensors 306 and an activity tracker 308. The application tracker 304 tracks the activities of one or more application programs 310 which are operating on the computing system 300. The application tracker 304 can provide the state (or status) of use of the one or more application programs 310. The one or more context sensors 306 can effectively provide a context of use of the application programs 310. In other words, a context sensor 306 can sense a context in which one or more applications have been used as a situation. The context of use can, for example, be determined based on various internal and/or external components, factors, elements and/or variables including environmental factors associated with one or more persons 312 who are interacting with one or more applications 310, as well as the state of use of one or more applications 310.

Referring to FIG. 3A, the state of use and context of use of the one or more applications 310 can be provided as input to activity tracker 308 which in turn can transform the information into the pattern of use data 314. The pattern extraction/prediction manager 320 can effectively manage the activities of an application and data vector map manager 322 and a usage predictor 324. Those skilled in the art will appreciate that the application and data vector map manager 322 can effectively select one or more pre-processors 326 depending, for example, on the type of the variables and data used to generate pattern of use data 314, applications 310 and/or end-applications. In other words, the application and data vector map manager 322 can effectively select a pre-processing technique to pre-process the pattern of use data 314 for a particular application and/or in consideration of a particular data format and/or arrangement used to generate data or needed for further processing including pattern extraction. After the pre-processing, the pattern extraction/prediction manager can effectively use one or more appropriate pattern extraction techniques using one or more of the pattern extractors 328 in order to extract a pattern of use from the pattern of use data 314. Similarly, one or more post-processors 330 can effectively perform post-processing in order to, for example, present data in a form which may be suitable for one or more applications. In particular, the usage predictor 324 can effectively use the post-processed data in order to determine the likelihood of use and/or make predictions about the use of the one or more applications 310 in various situations effectively defined and/or identified by the contextual data. Furthermore, the usage predictor 324 can effectively provide information to a pattern detection/behavior prediction application which can use the information for various applications 332.

Figure 3B:
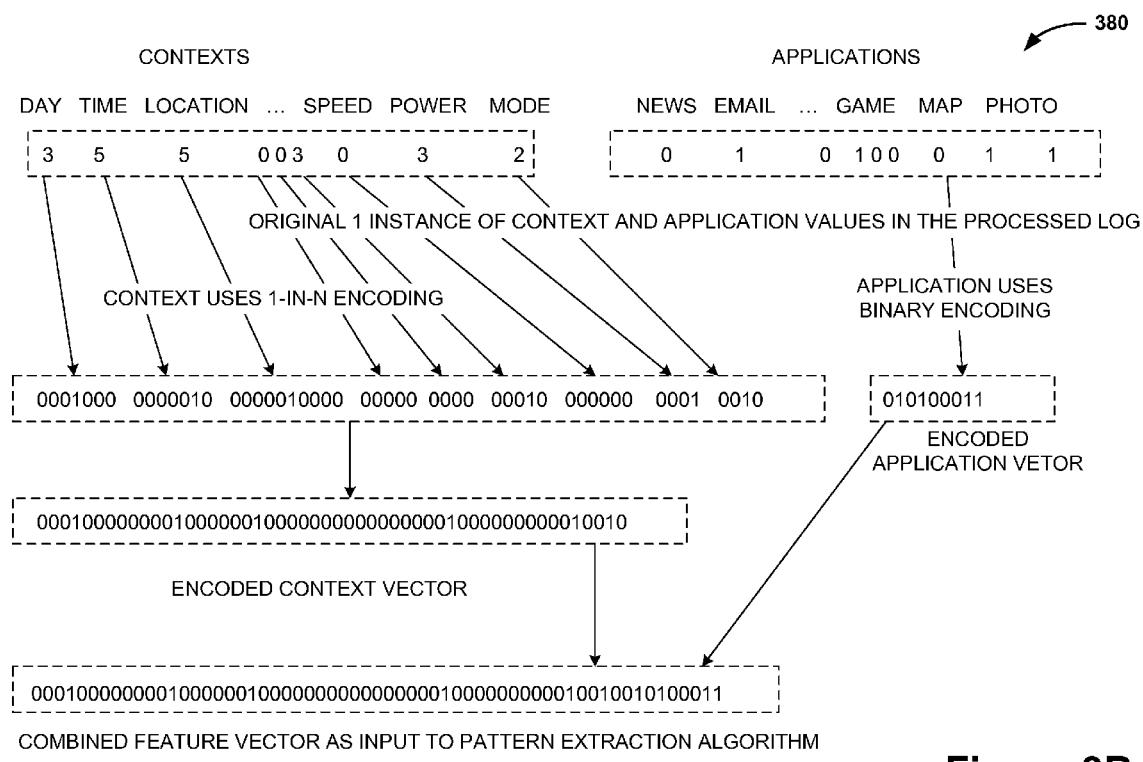
FIG. 3B depicts a process for generating pattern of use data in accordance with one embodiment of the invention.

To further elaborate, FIG. 3B depicts a process 380 for generating pattern of use data in accordance with one embodiment of the invention. More particularly, FIG. 3B represents a very simple example where both the applications being used and the context of use (e.g., contextual factor, variables and/or elements) are fixed and known. Referring to FIG. 3B, the following context variables can be considered: location, co-locators, day of week, time of day, temperature, sound, speed, and the power of the device. Further, the following applications can be considered: news, email, music player, game, map, camera, note-taking, Web access, and communicator. User activity can be logged, for example, in a simple log when a user takes an action in connection with an application (e.g., when a user opens an application and starts to interact with the application, user activities in connection with the application can be logged). An entry in the log can, for example, have a timestamp followed by the values of the context variables measured for a particular application. The log can be processed to transform the timestamp into day of week, time of day, and so on. Numerous other transformations can be performed. For example, for enumeration-typed variables, integers can be used to represent the enumerations (e.g., 0 to 6 are used to represent the 7 days in a week). As another example, the range of the values of numerical variables can be divided into intervals and each interval can be represented by an integer, (e.g., sound level 0-20 dB can be represented by 0, 20-40 dB by 1, 40-60 dB by 2, and so on.

An encoded application vector (indicating the state of use of the applications) can be combined with an encoded context vector to provide a combined application and context vector which can be provided to one or more pattern extraction algorithms for pattern extraction, thereby allowing determining situational patterns of use for the applications based on various situations (i.e., contexts) that have been effectively observed and logged for the device.

Those skilled in the art will readily appreciate that various pattern extraction techniques can be used to determine a pattern of use for a computing system in accordance with various embodiments of the invention. By way of example, a co-clustering approach can be used for pattern extraction (e.g., Minimum-Sum Squared Residue Co-clustering (MSSRCC) technique can be used to capture coherent as well as homogeneous trends latent in a given data matrix.

In accordance with one embodiment of the invention, an innovative co-clustering algorithm can be applied to various applications including pervasive mobile computing. A traditional one-way k-means algorithm with Euclidean distance measure aims at discovering homogeneous patterns over all features, whereas an innovative co-clustering algorithm (e.g., a modified MSSRCC) can employ an alternating minimization scheme to optimize both row and column dimensions simultaneously in accordance with the invention. As such, the innovative co-clustering algorithm can generate co-clusters in a "checkerboard" structure from an input matrix, where a row vector can include both a context part and an application part. The centroids of these co-clusters can then be used for various applications including predicating the use of a mobile device given a particular situation.

In view of the foregoing, it will readily be appreciated that the invention has numerous advantages. For example, one or more of the embodiments of the invention can provide one or more of the following advantages: 1) there is no need for predefining situations to be considered in determining patters of use, 2) there is no need for user-defined profiles, 3) there is no need for supervised training, 4) the invention allows adaptation to changes in patterns of use (e.g., changes in behavior, or environment of use), and 5) virtually an unlimited number of components, factors, elements and/or variables can be considered to determine a situation (i.e., contextual use information associated with state of use information).

It will also be appreciated that the techniques of the invention are especially suitable for mobile systems (e.g., mobile devices). In particular, a "situation" can be effectively defined to be a set of relevant context values that are frequently associated with a pattern of use associated with one or more persons (or users) using a mobile device (i.e., a behavioral pattern of use). A usage history can effectively include user interactions with a mobile device along with the context in which the interactions have occurred. The usage history can be processed to extract patterns of use of the mobile device. Moreover, without requiring the user to provide input in order to effectively train the mobile device (i.e., supervised training), latent patterns of use (behavioral patterns) can be extracted from the usage history. A pattern of use can, for example, include latent situations and tasks frequently performed in the situations as they occur. As such, the pattern of use can provide valuable information including the likelihood of the use of a mobile device in a particular situation (e.g., for a given situation, the likelihood the application is going to be used and/or used in a particular manner can be determined). It will be appreciated that in order to protect user privacy, all that functions needed to extract a pattern of use can run on the mobile device itself.

As noted above, various applications including pattern detection and/or behavior prediction applications 332 can use the integrated state and contextual data 114 and/or situational pattern of use data 118. More generally, likelihood of use of a computing system for a situation can be determined. It will be appreciated that potential uses of a computing system can be identified, made more accessible and/or recommended for use on the computing system.

Figure 4A:
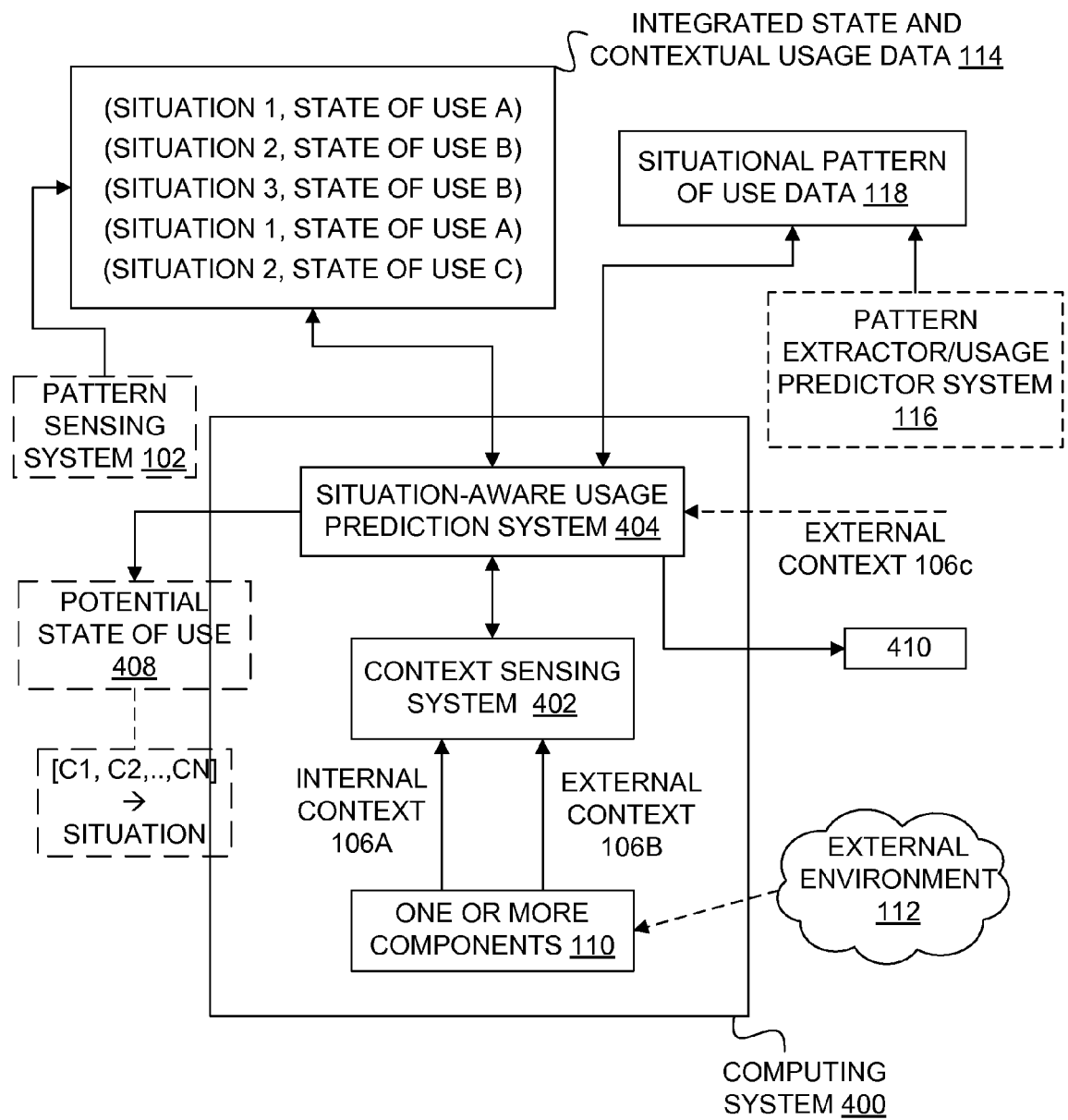
FIG. 4A depicts a computing system capable of identifying a potential use at a given situation in accordance with one embodiment of the invention.

To further elaborate, FIG. 4A depicts a computing system 400 capable of identifying a potential use at a given situation in accordance with one embodiment of the invention. Those skilled in the art will appreciate that the computing systems 100A and/or 100B can, for example, be a computing device that includes one or more processors and memory (not shown). As such, the computing systems 100A and/or 100B can, for example, be a general purpose computer, server, mobile device, mobile phone, and so on.

Moreover, it will be appreciated that the computing system 400 can identify this potential use for its own system and/or another computing system. Referring to FIG. 4A, the computing system 400 includes a context sensing system 402 and a situation-aware usage prediction system 404. The context sensing system 402 can obtain a context which effectively represents a first situation for the computing system 400. This context can, for example, be obtained as the current context. As such, the context sensing system 402 can effectively obtain a current situation for the computing system 400. In other words, the context sensing system 402 can obtain the current context of the computing system 400 at a given point in time as the current situation for the computing system 400 (e.g., a current situation determined for the computer system 400 at a particular time, duration and/or period of time). The context obtained by the context sensing system 402 can be the same and/or obtained in the same manner as the contextual information (contexts) 106 noted above with respect to FIG. 1A. As such, the context 106 obtained by the context sensing system 402 can be associated and/or determined by or based on one or more components 110 of the computing system 400. By way of example, the one or more components 110 can determine (e.g., measure) one or more factors, elements or variables associated with an external environment 112. As another example, internal context 106a representing the context of use of the computing system 400 may also be determined by and/or based on the one or more components 110. Again, it should be noted that external context 106c can also be received, for example, directly from one or more other external components (not shown). The context sensing system can, for example, include the contextual usage sensor 204 shown in FIG. 2A.

Generally, the context sensing system 402 can obtain one or more context variables ($C_1, \ldots, C_n$). The one or more context variables ($C_1, \ldots, C_n$) can effectively represent a situation for the computing system 400 in accordance with one aspect of the invention. A situation can be effectively represented by associating the one or more context values together to effectively represent a situation for the computing system 400. In other words, a situation can be defined and/or determined based on one or more context variables ($C_1, \ldots, C_n$). The representation can be made by the context sensing system 402 and/or the situation-aware usage predication system 404.

To further elaborate, FIG. 4A depicts a computing system 400 capable of identifying a potential use at a given situation in accordance with one embodiment of the invention. Those skilled in the art will appreciate that the computing systems 100A and/or 100B can, for example, be a computing device that includes one or more processors and memory (not shown). As such, the computing systems 100A and/or 100B can, for example, be a general purpose computer, server, mobile device, mobile phone, and so on.

Moreover, it will be appreciated that the computing system 400 can identify this potential use for its own system and/or another computing system. Referring to FIG. 4A, the computing system 400 includes a context sensing system 402 and a situation-aware usage prediction system 404. The context sensing system 402 can obtain a context which effectively represents a first situation for the computing system 400. This context can, for example, be obtained as the current context. As such, the context sensing system 402 can effectively obtain a current situation for the computing system 400. In other words, the context sensing system 402 can obtain the current context of the computing system 400 at a given point in time as the current situation for the computing system 400 (e.g., a current situation determined for the computer system 400 at a particular time, duration and/or period of time). The context obtained by the context sensing system 402 can be the same and/or obtained in the same manner as the contextual information (contexts) 106 noted above with respect to FIG. 1A. As such, the context 106 obtained by the context sensing system 402 can be associated and/or determined by or based on one or more components 110 of the computing system 400. By way of example, the one or more components 110 can determine (e.g., measure) one or more factors, elements or variables associated with an external environment 112. As another example, internal context 106a representing the context of use of the computing system 400 may also be determined by and/or based on the one or more components 110. Again, it should be noted that external context 106c can also be received, for example, directly from one or more other external components (not shown). The context sensing system can, for example, include the contextual usage sensor 204 shown in FIG. 2A.

It will also be appreciated that the situation-aware usage prediction system 404 can also predict based on one or more matching situations that the computing system 400 is to be used in accordance with one or more potential states of use, recommend, make accessible or more accessible, offer and/or initiate one or more potential states of use for use on the computing system 400. In addition, the situation-aware usage prediction system 404 can assign probabilities of use to one or more potential states of use and identifying a potential state of use with the highest probability as a "likely state of use". As such, a "likely state of use" can, for example, be recommended, offered and/or automatically initiated for use on the computing system 400.

As noted above, the state of use associated with a situation can, for example, include the state of use of a usable component (e.g., one or more applications that are effectively being used by a person). As such, the situation-aware usage prediction system 404 can, for example, recommend and/or offer one or more applications for use on the computing system. It will be appreciated that an application can be offered, recommended, made accessible, made or accessible, and/or automatically initiated in a particular manner (or manner of use) as indicated by the state of use of the application (e.g., a word processor can be offered with a particular set of configuration parameter and/or one or more files opened, a communication application can be offered to dial a particular number).

It should be noted that the situation-aware usage prediction system 404 can also be configured to determine whether a matching situations is known for a situation represented by the one or more context variables ($C_1, \ldots, C_n$). Moreover, if the situation-aware usage prediction system 404 determines that a matching situation is not known, the situation-aware usage prediction system 404 can effectively generate situation-specific relational pattern of use data 410. In other words, the situation-aware usage prediction system 404 can effectively extract a pattern of use for and/or in relation to the situation represented by the one or more context variables ($C_1, \ldots, C_n$). By way of example, integrated state and contextual usage data 114 and/or situational usage data 114 can be effectively regenerated based and/or for the one or more context variables ($C_1, \ldots, C_n$) representing a situation of interest. Those skilled in the art will readily appreciate that the computing system 400 can include one or more processors (not shown) that are adapted for and/or capable of performing the operations described above.

Figure 4B:
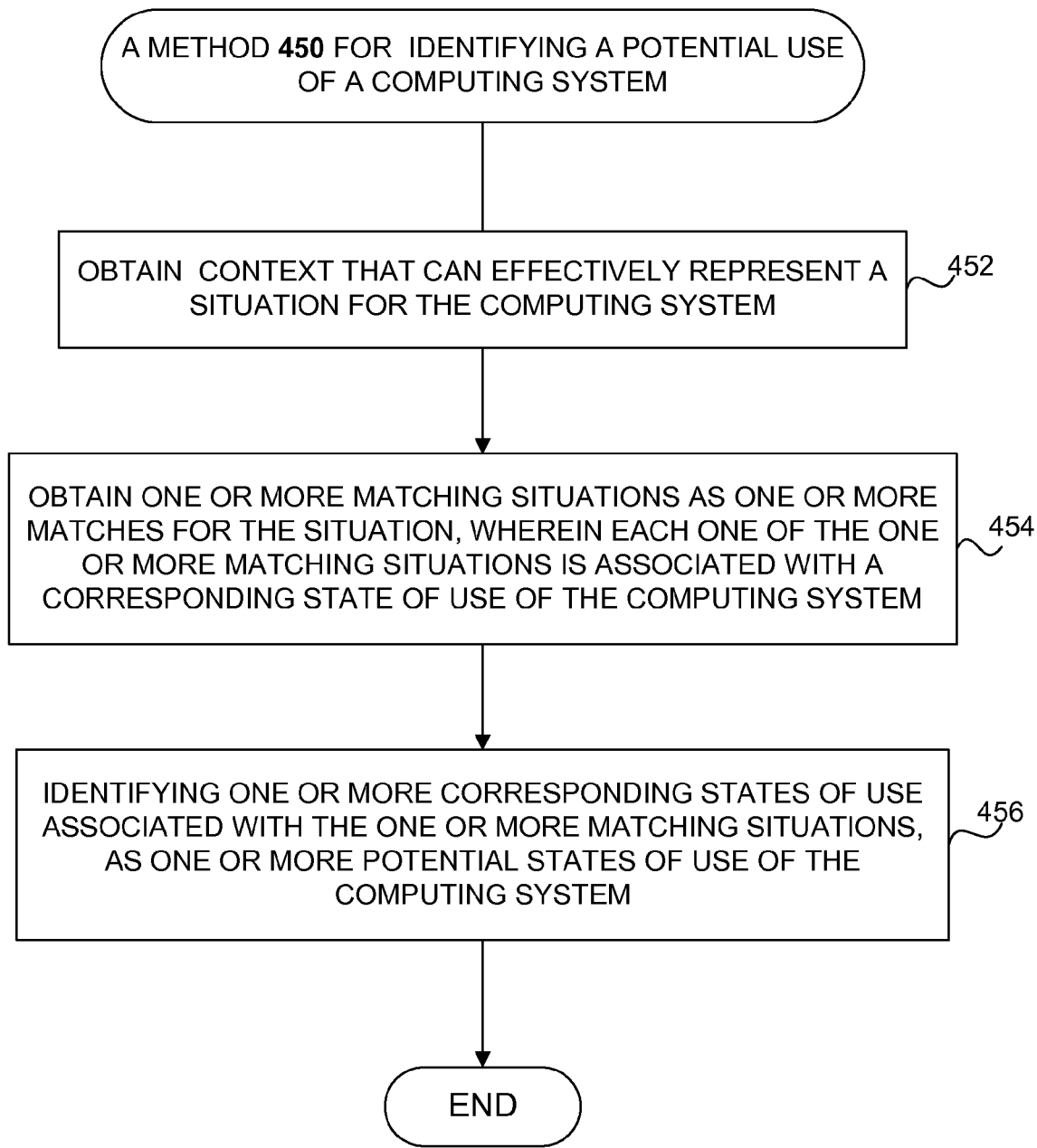
FIG. 4B depicts a method for identifying a potential use of a computing system in accordance with one embodiment of the invention.

FIG. 4B depicts a method 450 for identifying a potential use of a computing system in accordance with one aspect of the invention. The method 450 can, for example, be used by the computing system 400 depicted in FIG. 4A. Initially, a context for the computing system is obtained (452). It should be noted that the context can effectively represent a situation for the computing system. Obtaining of the context can, for example, include: receiving, reading, identifying, selecting and/or determining the context for the computing system.

Next, one or more matching situations are obtained (454) as one or more matches for the situation that can be effectively represented by the context obtained (452). It should be noted that each one of the one or more matching situations is associated with a corresponding state of use of the computing system. This means that the one or more matching situations effectively indicate that at least in a first matching situation the computing system has been used in accordance with a first state of use. Accordingly, one or more corresponding states of use associated with the one or more matching situations are identified (456), as one or more potential states of use of the computing system. It should be noted that obtaining (454) can, for example, include: receiving, reading, identifying, selecting and/or determining one or more matching situation for the situation represented by the context. The method 450 ends after one or more matching situations are identified (456) as one or more potential states of use of the computing system.

Figure 5A:
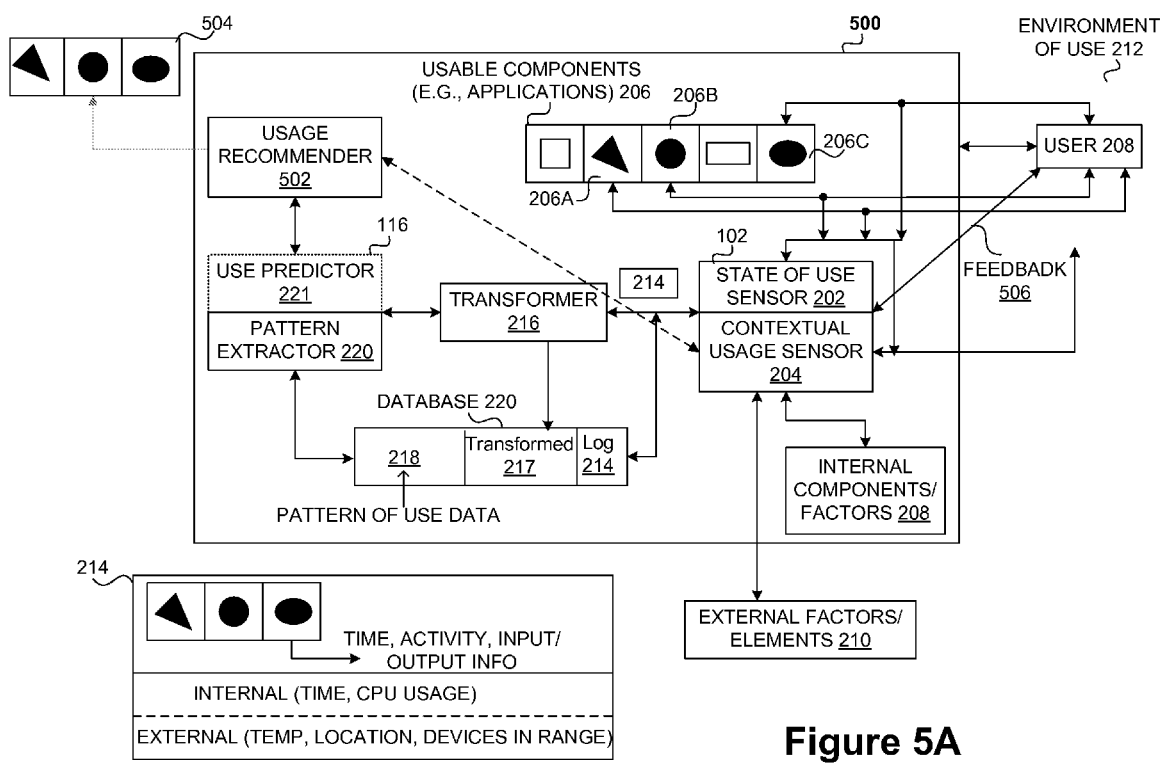
FIG. 5A depicts a computing system in greater detail in accordance with one embodiment of the invention.

As noted above, the pattern sensing system 102 and the pattern extractor/usage predictor system 116 can be effectively provided by the computing system 440 depicted in FIG. 4A. To further elaborate, FIG. 5A depicts a computing system 500 in greater detail in accordance with one embodiment of the invention. Referring to FIG. 5A, the computing system 500 effectively provides a pattern sensing system 102, a pattern extractor/usage predictor 116 and a usage recommender 502. The pattern sensing system 102 and pattern extractor/usage predictor 116 are described with reference to FIG. 2A.

As noted above, the pattern sensing system 102 includes the state of use sensor 202 and the contextual usage sensor 204. The state of use sensor 202 can effectively sense the state of use of one or more usable components 206 of the computing system 200. Generally, the one or more usable components 206 can be one or more hardware and/or software components of the computing system 200. By way of example, the usable components 206 can include one or more application programs that are being effectively used by a user 208 (e.g., one or more persons, one or more end-user application programs, one or more computing components or devices). As such, the state of use sensor 202 can, for example, sense the state of one or more usable components 206 which are active and being used by one or more persons 208 via one or more input/output devices (now shown). The other component of the pattern sensing system 102, namely, the contextual usage sensor 204, can effectively determine the context of use of the computing system 200. In general, the context of use determined by the contextual usage sensor 204 can include internal and external components, elements, variables and/or factors 208 and 210.

Referring to FIG. 5A, the usage recommender 502 can effectively recommend one or more usable components 504 for a situation. The usage recommender 502 can use the contextual usage sensor 204 to obtain a situation for the computing system 500. By way of example, the usage recommender 502 can be configured to request the contextual usage sensor 204 to determine the current situation of the computing system 500. The current situation can, for example, be determined based on one or more context variables ($C_1, \ldots, C_n$). The contextual usage sensor 204 and/or the usage recommender 502 can be configured to determine which context variables are to be determined (e.g., measured).

In any case, the usage recommender 502 can identify one or more matching situations for the situation that is effectively determined by the contextual usage sensor 204. The one or more matching situations can be determined based on situational pattern of use data 218 pattern that effectively identifies a pattern of use of one or more usable components (e.g., usable components 206) of the computing system 500. As noted above, situational pattern of use data 218 can be determined based on the integrated state and contextual usage data 214 providing the context and state of use of one or more usable components (e.g., usable components 206). Again, it should be noted that the integrated state and contextual usage data 214 can be effectively provided as input to a transformer 216 which transforms the data into a form 217 which is readily available for a pattern extractor 220 which is provided as a part of the pattern extractor/usage predictor 116. The pattern extractor 220 can effectively extract one or more usage patterns as pattern of use data 218 which can be stored in a database 223. As noted above, a use predictor 221 can effectively use the pattern of use data 218 in order to determine the likelihood of use of the computing system 500.

It will be appreciated that the usage recommender 502 can interface directly and/or via the use predictor 221 with the pattern extractor 220 in order to access and/or use the situational pattern of use data 218. More generally, the usage recommender 502 can use the logged (historical) data 214, transformed data 217 and/or the situation pattern of use data 218 to identify one or more matching situations for a particular situation (e.g., a current situation of the computing system 500). Typically, the one or more matching situations are identified based on the pattern of use data 217 stored in the database 220. However, the usage recommender 502 can be configured to effectively cause the pattern of use data to be generated dynamically when there is a need to make a recommendation for a given situation.

It will also be appreciated that the computing system 500 can be configured to consider whether the one or more recommended usable components 504 are used in the situation for which the recommendation is made. In other words, the computing system 500 can determine the accuracy of the recommendations it makes by determining whether the recommended usable components 504 are used as recommended for a particular situation. Referring to FIG. 5A, whether the recommended usable components 504 are used can be effectively provided as feedback 506 to pattern sensing system 102. The feedback 506 can be used to assess the accuracy of the recommendation made and to generate improved situational pattern of use data that takes the feedback 506 into account. By way of example, the use of the recommended usable components 504 as recommended or use of another one or more usable components contrary to the recommendation can be stored in log (or historical) data 214 and subsequently used to generate improved pattern of use data.

Figure 5B:
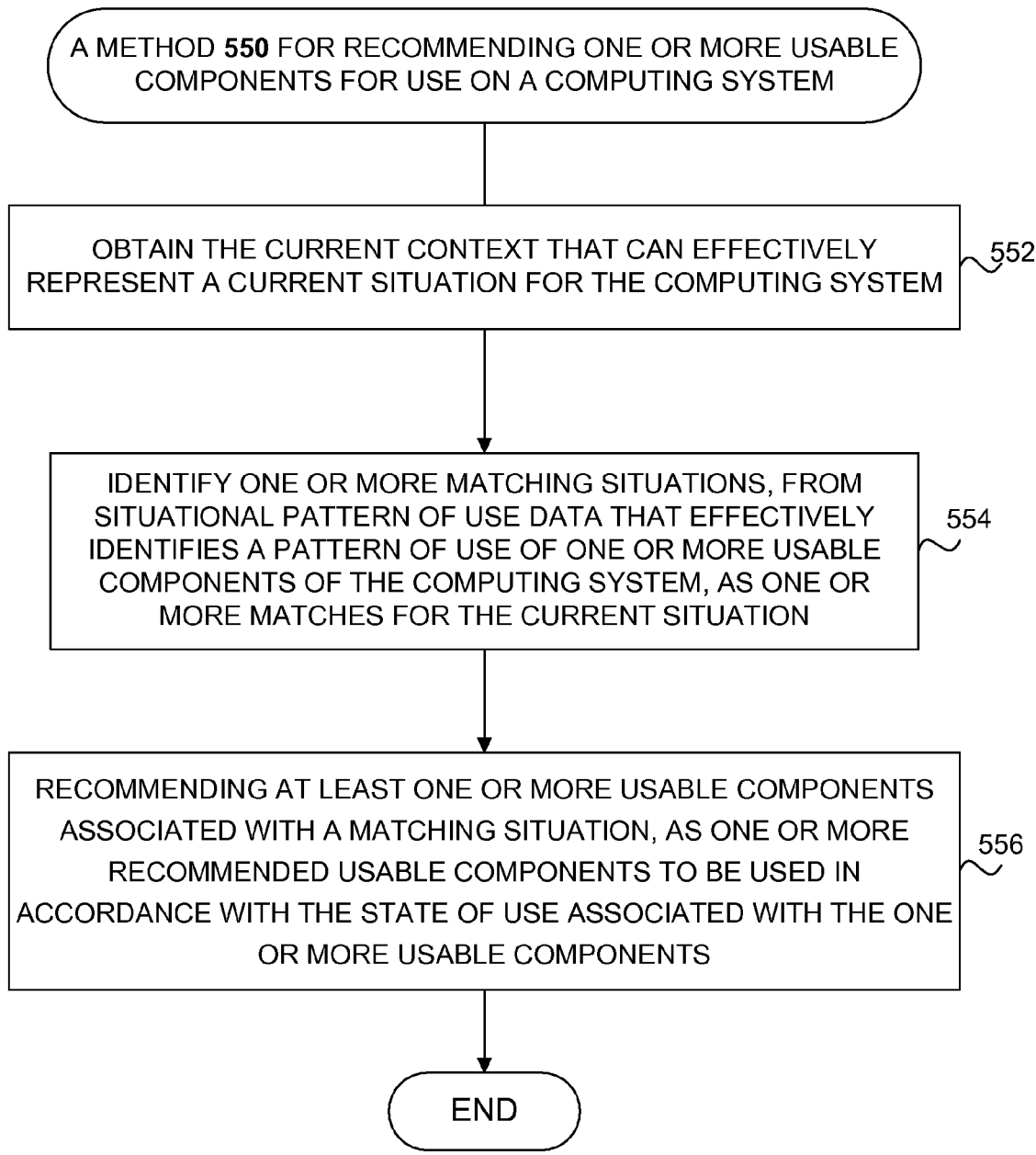
FIG. 5B depicts a method for recommending one or more usable components for use on a computing system in accordance with one embodiment of the invention.

FIG. 5B depicts a method 550 for recommending one or more usable components for use on a computing system in accordance with one embodiment of the invention. The method 550 can, for example, be used by the computing system 500 depicted in FIG. 5A. Initially, a current context for the computing system is obtained (552) as a current situation for the computing system. Next, one or more matching situations are identified (554) for the current situation. It should be noted that the one or more matching situations are identified based on situational pattern of use data that effectively identifies a pattern of use of one or more usable components of the computing system. Typically, each one of the one or more matching situations is associated with a corresponding state of use of one or more usable components of the computing system. As such, the pattern of use data effectively indicates that at least in a first matching situation, a particular one or more usable components (first one or more usable components) have been used in accordance with a particular state of use (a first state of use). Accordingly, one or more usable components associated with a particular matching situation (e.g., a first matching situation) are recommended (556) as one or more recommended usable components. It should be noted that the one or more usable components can be recommended (556) for use in accordance with a particular state of use (e.g., first state of use) which is associated with the corresponding matching situation (e.g., first state of use which is associated with a first situation identifies as a first matching situation). The method 550 ends after at least one or more usable components are recommended (556).

As noted above, the one or more usable components 504 can, for example, include one or more applications. The one or more applications can be executing on the computing system 500 and effectively used by one or more persons. As such, the usage recommender 502 can effectively recommend one or more applications for use by one or more persons who are using the computing system 500. In other words, the usage recommender 502 can be provided as an application task managing system that can recommend applications to the user of a computing device.

Figure 6A:
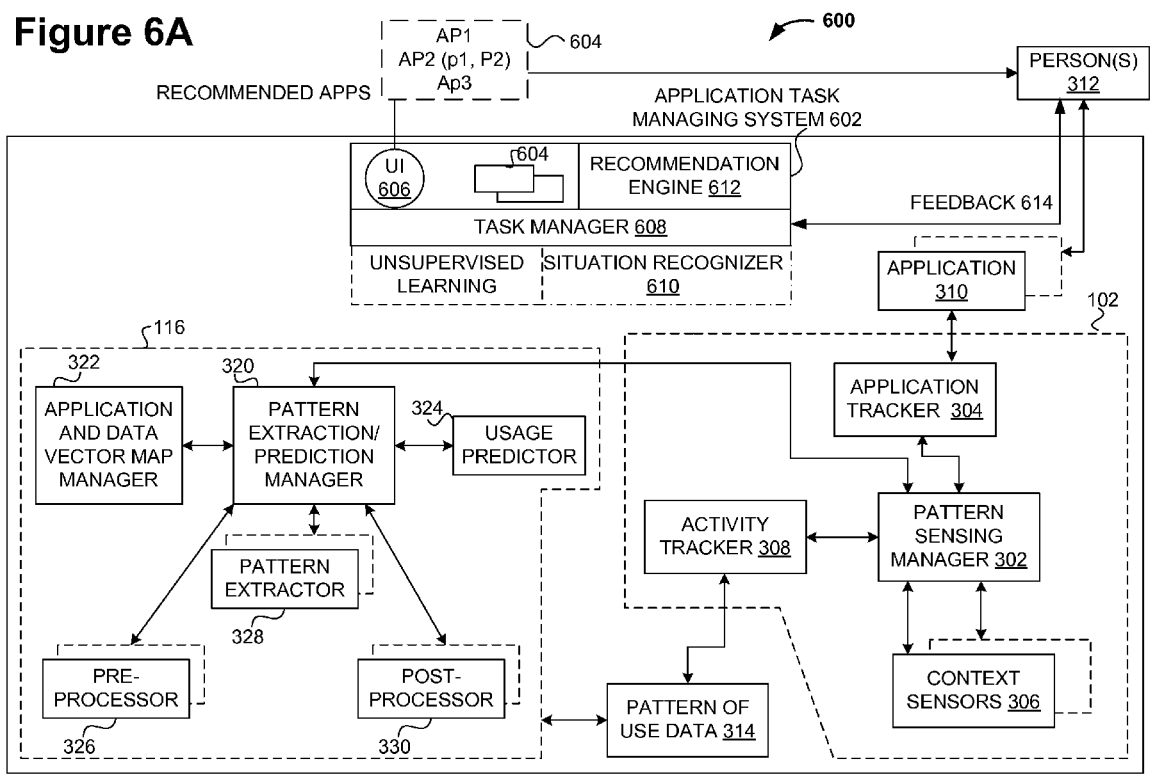
FIG. 6A depicts a computing system which provides an application task manager system in accordance with one embodiment of the invention.

To elaborate even further, FIG. 6A depicts a computing system 600 which provides an application task manager system 602 in accordance with one embodiment of the invention. The application task manager 602 can effectively recommend one or more applications 604 for use by one or more persons 312. The one or more persons 312 can interact with the application task manager 602 via a User Interface (e.g., Graphical User Interface) 606. The User Interface 606 can, for example, include a component (e.g., a button, an icon) that allows the person(s) 312 to request a recommendation to be made. By way of example, by pressing a recommendation button, a person can effectively activate the task manager 608 and make a request for a recommendation for a current situation. The task manager 608 can effectively ask the pattern sensing manager 302 and/or its context sensors 306 to determine the current context based on one or more context variables ($C_1, \ldots, C_n$). The pattern sensing manager 302 and/or its context sensors 306 act as a current context (or current situation) manager in determining the situation when the recommendation is made.

The task manager 606 can effectively obtain situational pattern of use data from the pattern extraction/prediction manger 320. By way of example, the task manager 606 can use of or more obtained context values and its application ID to form a current situation prediction request and send the request to the pattern extraction/prediction manger 320. If learned associations of situations and application usage patterns are already available, the historic associations can be obtained and the similarity of the current contexts with the situations can be determined. Associations whose situations are similar to a particular situation (e.g., current situation determined by current context variables) can be recomputed. If the learned associations are inadequate, one or more pattern extractors 328, pre-processor 326 and/or post-processors 330 that may be better suited can be selected. Subsequently, the trace data that is more relevant and/or better suited can be obtained from the data store and transformed using the selected pre-processor, and then a selected pattern extractor can be used to extract the pattern from the transformed data. The results of the extraction are associations of situations and application usage patterns. This result can be transformed using a selected post processor in order to compute the similarity between the situations effectively identified with the current situation contexts. The situations that are similar to the current situation can be recomputed and the result can be stored.

The task manger 608 can be configured to receive the results returned from the situation-based pattern extractors 328 and effectively pass the results to the recommendation engine 612 in order to request a recommendation to be made with respect to one or more applications for use in the current situation. The task manger 608 can further transform the data (results provided by the pattern extractors 328) into a form that is more suitable for the recommendation engine 612.

The recommendation engine 612 can choose one or more applications most suitable for the situation as one or more recommended applications 604. Those skilled in the art will readily appreciate that the recommendation engine 612 can be as configured to, for example, simply choose the application patterns whose associated situation is most or least similar to the current context variables (current context representing a current situation). The recommendation engine 612 can also be configured to effectively reason beyond the situations and the application patterns by considering additional factors (e.g., rules) so that the recommended applications 604 can ultimately reflect what is desired and/or needed.

The recommendation engine 612 can provide the task manager 608 with one or more recommended applications 604, which in turn, are provided to the user interface and displayed for the person(s) 312 accordingly (e.g., icons for the recommended applications are displayed for access by the user. When a person 312 chooses an application, either among the recommended applications 604 or applications which are not recommended, the information can be passed through the task manager 608 to the pattern sensing manager 302 which effectively behaves as a current situation (or context) manager. The pattern sensing manager 302 (or a context manager component) will then pass this information together with the context values measured at the time the application were selected for use. The information can be subsequently used by the pattern extractors 328 to make better recommendations. It should be noted that task manager 608 can provide this information also to the recommendation engine 612 so that it can make better recommendations. As such, the action taken by a person 312 in either accepting or rejecting the recommendations made by the application task manager system 602 can be considered as feedback 614.

In effect, the application task managing system 602 can benefit from a situation recognizer 610 that uses unsupervised learning in order to extract latent patterns of situations and their associated tasks which can be stored as log (or historical data). The situation recognizer 610 can also identify historical situations that are similar to the current situation and sends similar situations (or matching situations) along with their associated tasks to the recommendation engine 612. The recommendation engine can also be configured to rank the recommended applications. Referring to FIG. 6A, recommended applications 604 can be ranked. In addition, a particular recommended application can be recommended in accordance with a particular state of use (e.g., a second recommended application A2 can be recommend with first and second parameters P1 and P2). It should be noted that the context sensed by the context sensors 306 can, for example, include current location identifies configured to detect the current geographical location by, for example, sensing nearby WiFi access points. As another example, co-locators can be used to sense (or identify), for example, nearby devices and/or people by detecting Bluetooth signals.

As noted above, An encoded application vector (indicating the state of use of the applications) can be combined with an encoded context vector to provide a combined application and context vector which can be provided to one or more pattern extraction algorithms for pattern extraction, thereby allowing determining situational patterns of use for the applications based on various situations (i.e., contexts) that have been effectively observed and logged for the device. Also, various pattern extraction techniques can be used to determine a pattern of use for a computing system. By way of example, a co-clustering approach can be used for pattern extraction (e.g., Minimum-Sum Squared Residue Co-clustering (MSSRCC) technique can be used to capture coherent as well as homogeneous trends latent in a given data matrix. Furthermore, an innovative co-clustering algorithm can be applied to various applications including pervasive mobile computing. A traditional one-way k-means algorithm with Euclidean distance measure aims at discovering homogeneous patterns over all features, whereas an innovative co-clustering algorithm (e.g., a modified MSSRCC) can employ an alternating minimization scheme to optimize both row and column dimensions simultaneously in accordance with the invention. As such, the innovative co-clustering algorithm can generate co-clusters in a "checkerboard" structure from an input matrix, where a row vector can include both a context part and an application part. The centroids of these co-clusters can then be used for recommending application or tasks. More particularly, situations that are similar to the current situation (or context) can be identified by computing the Euclidean distances between the current context and the context part of every co-cluster centroids. The application parts of the centroids of the identified similar situations are then used to rank the applications.

Figure 6B:
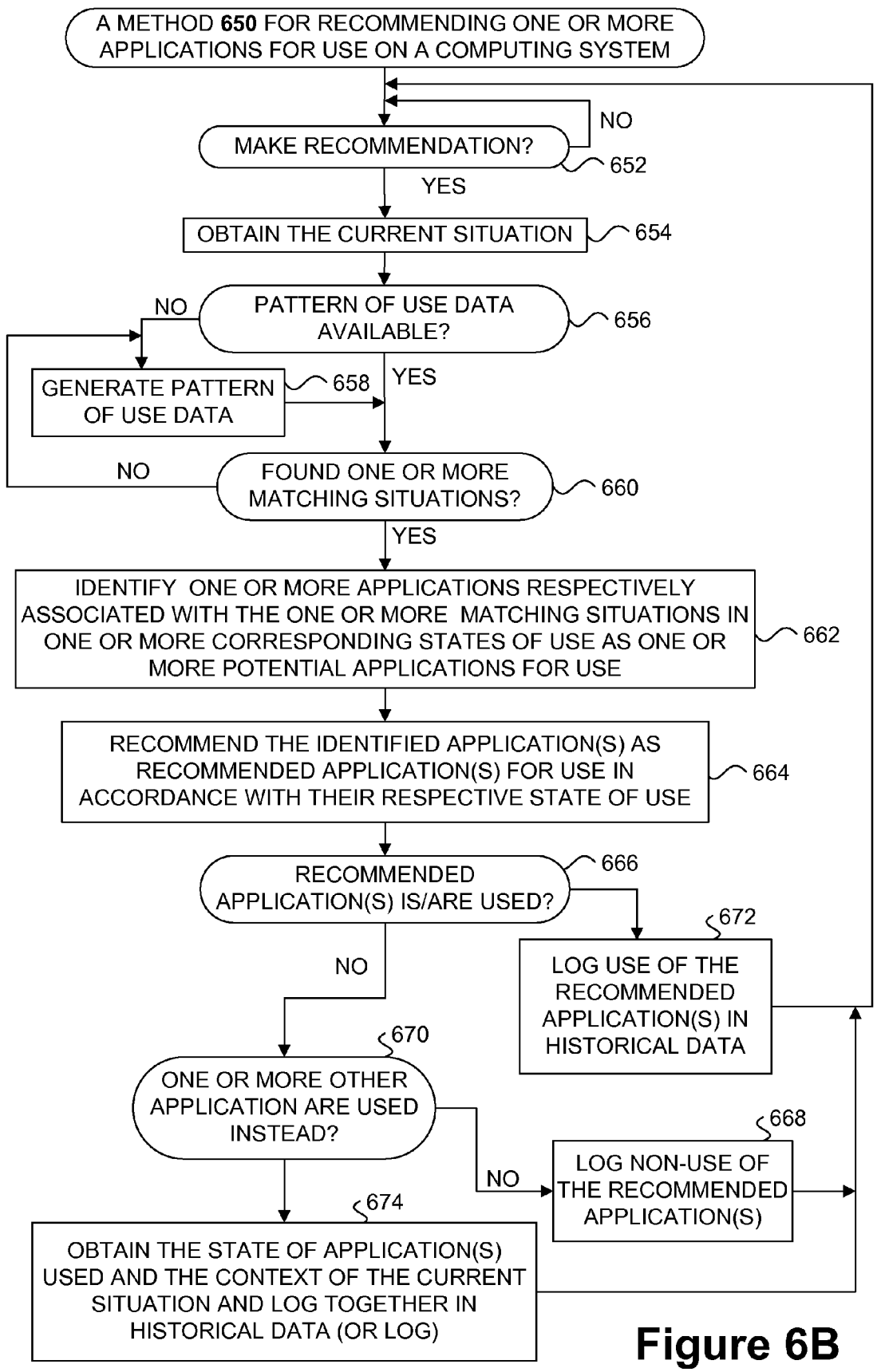
FIG. 6B depicts a method for recommending one or more applications for use on a computing system in accordance with one embodiment of the invention.

FIG. 6B depicts a method 650 for recommending one or more applications for use on a computing system in accordance with one embodiment of the invention. The method 650 can, for example, be used by the computing system 600 shown in FIG. 6A. Initially, it is determined (652) whether to make a recommendation. By way of example, it can be determined (652) whether a request for recommendation has been received, one or more conditions have been met and/or one or more events have occurred. In effect, the method 650 can wait until it is determined (652) to make a recommendation. If it is determined (652) to make a recommendation, a current situation for the computing system is obtained (654) (e.g., a current situation is determined based on one or more context (or contextual) variables). Next, it is determined (656) whether pattern of use data is available. Generally, it can be determined (656) whether any pattern of use data is available and/or whether pattern of use data which is suitable for the current situation is available. If it is determined (656) that pattern of use data (or suitable pattern of use data) is not available, pattern of use data is generated (658). Subsequently, it is determined (660) whether one or more matching (or suitable) situations that match the current situation can be identified from the pattern of use data. If it is determined (660) that no suitable matching situation has been identified, pattern of use data can be generated (658) again. However, if it is determined (660) that one or more matching situations have been identified, one or more applications respectively associated with the one or more matching situations are identified (662). It should be noted that the pattern of use data also effectively identifies the respective one or more states of use of the one or more applications. As such, one or more states of use respectively associated with the one or more applications (application states) can also be identified (662). Accordingly, the one or more identified (662) applications can be recommended as one or more recommended applications in accordance with their respective states of use as indicated by the one or more matching situations. Thereafter, it is determined (666) whether the one or more recommended applications are used as recommended. Generally, it can be determined whether a recommended application is used and/or whether the recommended application is used in accordance with its recommended state of use. If it is determined (666) that the one or more recommended applications are used as recommended, the use of the one or more recommended applications is logged in historical data (or log). On the other hand, if it is determined (666) that the one or more recommended applications are not used as recommended for the current situation, it is determined (670) whether one or more other applications are used in the current situation instead of the recommended one or more applications. If it is determined (670) that one or more other applications are not used in the current situation instead of the recommended one or more applications, the fact that the recommended one or more applications were not used can be logged (672) in historical data. However, If it is determined (670) that one or more other applications are not used in the current situation instead of the recommended one or more applications, the state of use of the one or more other applications which are used and the current context representing the current situation (e.g., one or more current context variables) is obtained and logged (674) in historical data. In any case, the logged information can be used to generate more accurate pattern of use data and/or improve the reasoning used to recommend applications in order to ultimately provide better recommendations. After logging (668 or 672), the method 650 can determine (652) whether to make a recommendation and can proceeds in a similar manner to recommend (666) one or more applications for use on the computing system.

Figure 7A:
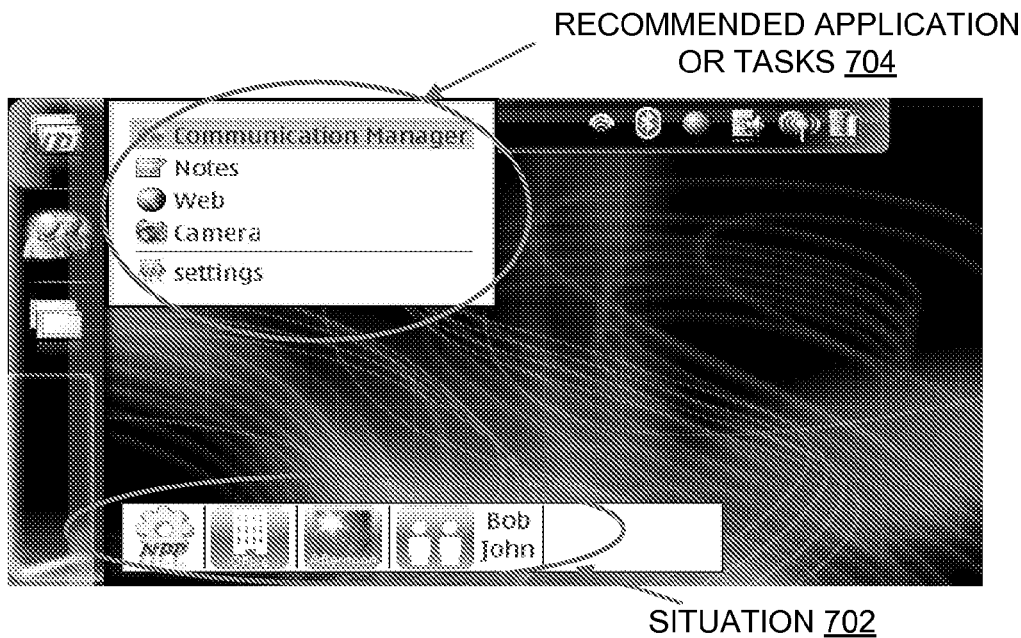
FIGS. 7A and 7B depict screenshots representing simple exemplary situations in accordance with one embodiment of the invention.
Figure 7B:
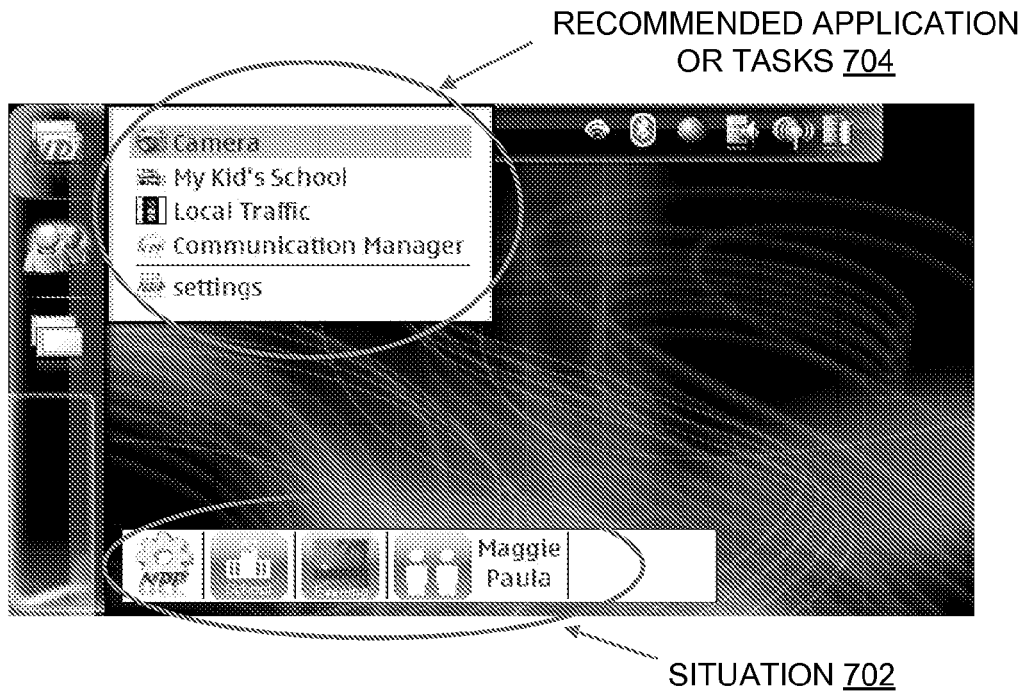

To further demonstrate recommending applications based on situations, FIGS. 7A and 7B depict screenshots representing simple exemplary situations in accordance with the invention. Referring to FIG. 7A, an "office meeting in the afternoon" is depicted using only three (3) simple context variables, namely, time, location, and co-locator information. The applet 702 shows the context of the current situation: "office", "afternoon", and with co-locators identifying two coworkers as "Bob" and "John". In this situation representing an office meeting in the afternoon, a pull-down menu 704 shows that recommended applications or tasks: communication, notes, Web, and camera. The recommendations effectively reflects the behavior of the person using the device, namely, that the person often takes notes, snapshot pictures, and browses the Web during office meetings in the afternoon.

In contrast to FIG. 7A, FIG. 7B depicts a screenshot representing a different situation, namely, "picking up kids at the evening" in accordance with one embodiment of the invention. Referring to FIG. 7B, the applet 702 now shows "school," "evening," and "Maggie" and "Paula." As a result, "camera", "kid school Web site" and "local traffic service" are recommended as preferred applications or tasks 704 in this situation when a person is picking up the kids in the evening rather then attending a meeting in the office in the afternoon.

As noted above, state (or status) of use and contextual information (or context) that effectively represents a situation can be obtained and associated with each other to form integrated state and contextual usage data which can be used to generate situational pattern of use data. It will be appreciated that a state of use can be obtained for specific applications.

In particular, a communication state of use (or communication state) representing a state of communication associated with one or more systems can be defined and obtained in accordance with one aspect of the invention. Typically, a communication state of use represents the state of communication effectively used by and/or on behalf of one or more systems to communicate with one or more other systems. By way of example, a communication state can include the states of one or more communication applications and/or tasks used by a device to communicate with another device.

In any case, communication state of use can be associated with contextual information (or context) that effectively represents a situation to form integrated communication state contextual usage data which can be used to generate situational pattern of communication use data representing pattern of communication use.

Figure 8:
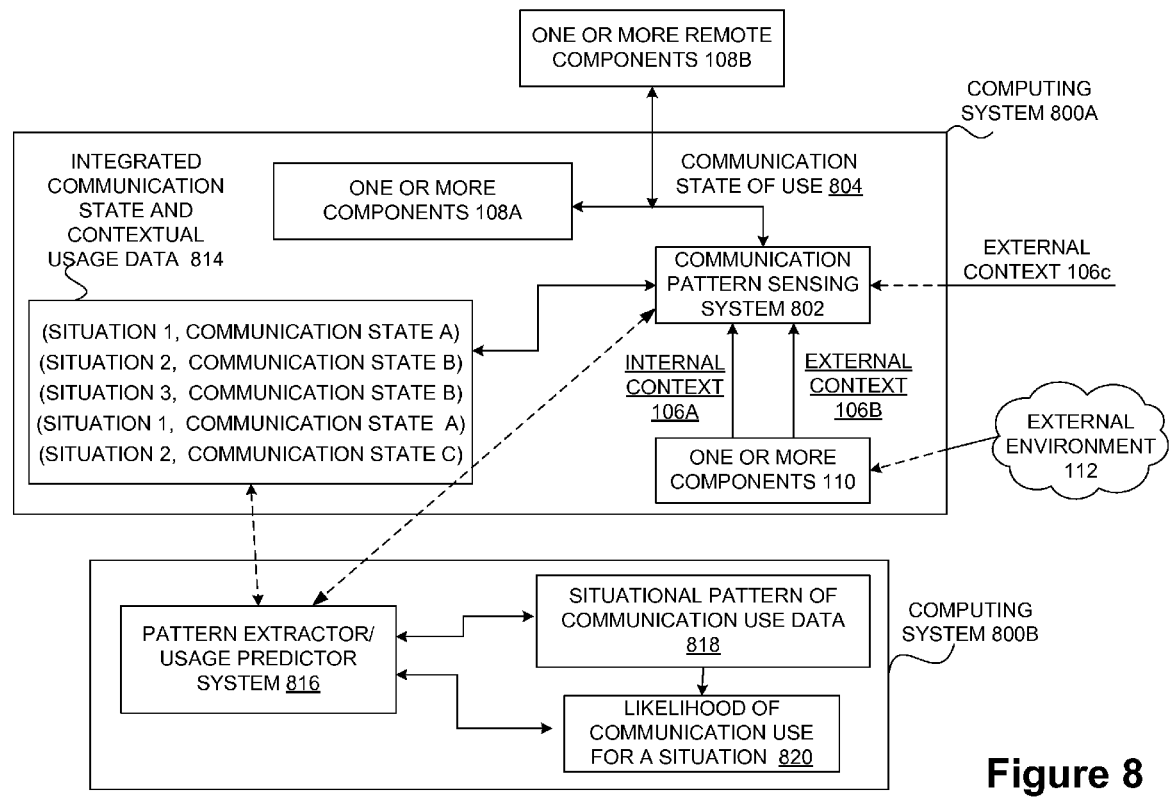
FIG. 8 depicts computing systems in accordance with one embodiment of the invention.

To further elaborate, FIG. 8 computing systems 800A and 800B in accordance with various embodiments of the invention. Those skilled in the art will appreciate that the computing systems 800A and/or 100B can, for example, be a computing device that includes one or more processors and memory (not shown). Referring to FIG. 8, the computing system 800A effectively includes a communication pattern sensing system 802 adapted for and/or capable of obtaining a communication state (or status) of use (or communication state) 804 and contextual information (contexts) 106.

Typically, the communication state of use 804 is associated with and can be determined based on the communication state (or status) of one or more components 108 of the computing system 100A. Generally, the one or more components can be components which are associated with communication of the computing system 800A (e.g., communication components). The components 108 can include internal (108A) and remote (108B) components. The one or more components 108 can, for example, be one or more operational and/or executable components and/or usable components (e.g., one or more communication application programs and/or tasks being executed on the computing system 800A).

In addition to the communication state of use 804, the pattern sensing system 802 can also obtain context 106. The context 106 can, for example, be obtained by the communication pattern sensing system 802 in a similar manner as that described above with respect to FIG. 1A. As such, the context 106 can be associated and/or determined by or based on one or more components 110. The communication pattern sensing system 802 can process the communication state of use information 804 and contextual information 106 in order to generate integrated communication state and contextual usage data 814. It will be appreciated that the communication pattern sensing system 802 can effectively represent the contextual information 806 as the situation associated with the communication state of use 804. As such, the integrated communication state contextual usage data 814 can effectively include a set of situations (e.g., situation 1, situation 2, and situation 3) with their respective (or associated) communication state of use (or communication states) (e.g., communication state of use A, communication state of use B, communication state of use C). By way of example, the integrated communication state contextual usage data 814 can effectively indicate that in a first situation, (situation 1), the computing system 800A has been in a first communication state of use (state of use A), and so on. As result, the integrated communication state and contextual usage data 814 allows determining a communication pattern of use associated with communications of the computing system 800A based on the association of a communication state of use with a particular situation in which the communication state of use has been effectively observed.

More particularly, a communication pattern extractor/usage predictor system 816 can effectively obtain the integrated communication state and contextual usage data 814 in order to determine the situational pattern of communication use data 818 based on the association of the communication state of use and the situation in which the communication use has been observed. It will be appreciated that the situational pattern of communication use data 818 can be used for various purposes. By way of example, the situational pattern of communication use data 818 can be used to determine the likelihood of communication use of the computing system 800A in a particular situation. As such, the likelihood of use 120 can, for example, effectively indicate the probability of the computing system 100A being used in a particular situation (e.g., situation 2) in accordance with a particular communication state of use (e.g., communication state of use C).

A communication state of use can, for example, include one or more of the following: one or more communication applications and/or tasks, the state of one or more communication applications and/or tasks, one or more modes of communications, one or more communication protocols, one or more modes and/or protocols of communication used by one or more communication applications and/or tasks, manner of use of one or more communication applications and/or tasks, one or more parameters used for and/or by one or more communication applications, one or more parameters associated with initiation, use and/or completion of one or more communication applications and/or tasks. As such, a communication state use can, for example, include and/or effectively consider one or more of the following: communication state of use further includes one or more of the following: time and/or duration of communication associated with one or more communication applications and/or tasks, data received and/or transmitted by one or more communication applications and/or tasks, type, size and/or content of data received and/or transmitted by one or more communication applications and/or tasks, and one or more senders, recipients, agents, persons, groups, and entities associated with one or more communication applications and/or tasks.

Those skilled in the art will readily appreciate that the communication pattern sensing system 802 and pattern extractor/usage predictor system 816 can be combined and provided for a single computing system (e.g., a computing and/or communication device). In other words, a single computing system can effectively determine the integrated communication state and contextual usage data 814 and use it to extract the situational pattern of communication use data 818. It should also be noted that the communication pattern sensing system 802 can effectively connected to the pattern extractor/usage predictor system 816. As such, the communication pattern sensing system 802 can effectively provide the integrated communication state and contextual usage data 814 to the pattern extractor/usage predictor system 816. In addition, the pattern extractor/usage predictor system 816 can effectively provide feedback to the communication pattern sensing system 802, for example, based on the situational pattern of communication use data 818 and/or the likelihood of use 120, in order to, for example, affect the information gathered by the communication pattern sensing system 102.

The pattern extractor/usage predictor system 116 can, for example, determine a pattern of communication use based on the frequency of occurrence of one or more communication states of use with respect to one or more situations. It will be appreciated that there is no need to provide the computing system 800A or 800B with supervised training in order to determine a communication pattern of use (e.g., communication pattern of use of the computing system 800A). Further, it will be appreciated that the situations effectively represented by the integrated communication state and contextual usage data 814 need not be predefined prior to their occurrence. In other words, situations can be defined as they occur. As such, the pattern of use data 118 can, for example, be used in a dynamic manner to define and/or affect the information being obtained. Similarly, communication states of use need not be predefined prior to their occurrence. As a result, the computing systems 100A and 100B can readily adapt to new uses (e.g., new applications and/or tasks) and situations, as well as a change in communication usage (e.g., a change with respect to communication applications and/or that are frequently used, use of a device by a different user or a user with different habits) and/or change in situations associated with the use of the computing system (e.g., using a device that has been used in an office at home, moving to a different geographical location).

It will be appreciated that integrated communication sate and contextual usage data 814 and/or situational pattern of communication use data 818 can be used to effectively manage communication activities associated with various entities (e.g., communication performed by and/or on behalf of systems, devices, persons).

Figure 9A:
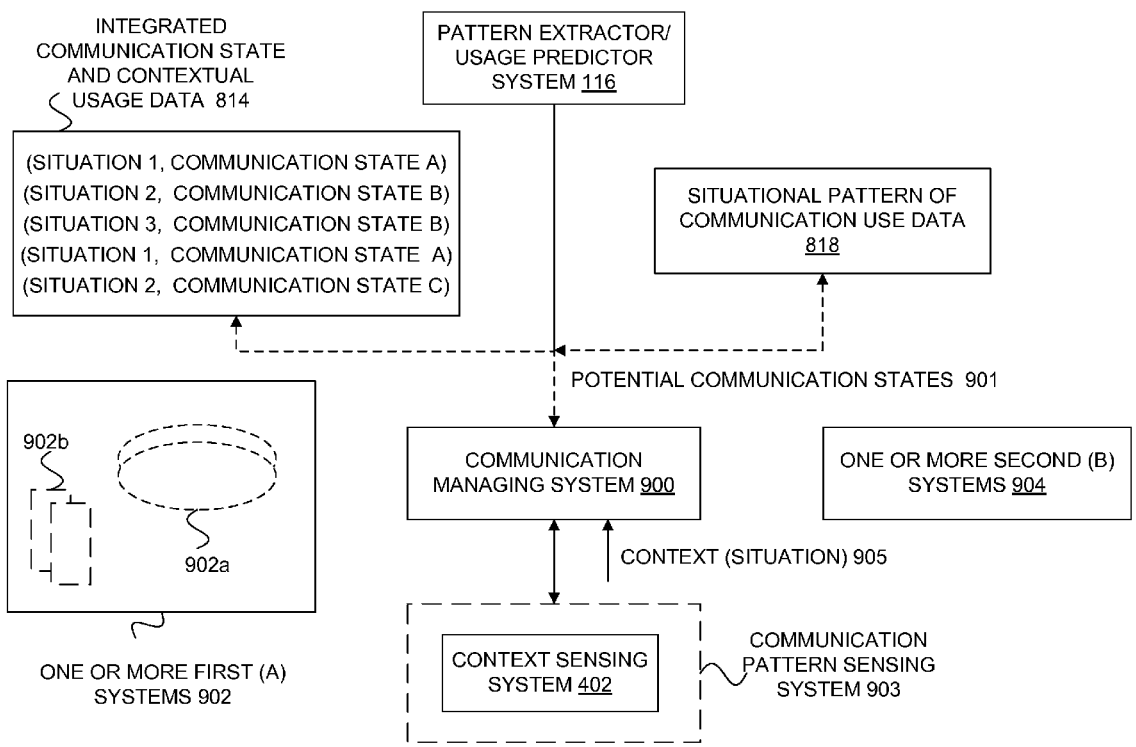
FIG. 9A depicts a communication managing system for managing communication of one or more systems in accordance with one embodiment of the invention.

To further elaborate, FIG. 9A depicts a communication managing system 900 for managing communication of one or more systems 902 in accordance with one embodiment of the invention. More particularly, the communication managing system 900 can determine one or more first potential communication states 901 for communication by and/or on behalf of the one or more first systems 902 in a particular situation. It will be appreciated that a potential communication state 901, among other things, can be used for better management of communication activities. By way of example, the communication managing system 900 can be adapted to suggest, recommend, make accessible, make more accessible, and/or initiate the one or more potential communication states 901 for communication by and/or on behalf of the one or more first systems 902. The first systems 102 can, for example, include one or more communication and/or network systems 902a and one or more communication and/or computing devices 902b (e.g., mobile phones, Smartphones, laptop computers, personal desktop computers, servers, digital personal assistants). Other examples include one or more communication systems, one or more networks, one or more communication devices, one or more devices, one or more mobile phones, one or more Smartphones, one or more computing systems, one or more laptop computers, one or more desktop personal computers, one or more servers, one or more digital personal assistants.

Generally, the communication managing system 900 can be adapted to manage the communications activities associated with the one or more first systems 902 and one or more second systems 904. More particularly, the communication managing system 900 can be adapted to obtain (e.g., receive, determine, identify, select) a context 905 for the one or more first systems 902. It should be noted that the context 905 (e.g., a current context) can effectively represent a situation (e.g., a current situation) for the one or more first systems 902. The context 905 can, for example, be effectively provided by a communication pattern sensing system 903 or a context sensing system 402 which can also serve as one of the components of the communication pattern sensing system 902.

In any case, the communication managing system 900 can obtain one or more known situation that are considered to be a match (matching situations) for the situation represented by the context 905. Generally, a matching situation is associated with one or more corresponding communication states of use effectively used by and/or on behalf of the one or more first systems 902 to communicate (e.g., communication between two or more systems 902, communication between a system 902 with another system 904). The matching situation can, for example, be obtained from the integrated communication state and contextual usage data 814 and/or situational pattern of communication use data 818 either of which may be obtainable from a pattern extractor/usage predictor 116.

As such, a matching situation can effectively identify one or more corresponding communication states of use. Therefore, based on the one or more communication states of use respectively associated with one or more matching situations, the communication managing system 900 can determine one or more potential communication states 901 for communication by and/or on behalf of the one or more first systems 902. By way of example, if the context 902 represents a first situation (situation 1), then the matching corresponding communication state A can be identified. Then, a potential communication state 901 can be determined based on the communication state A. For example, the communication state A can be identified and/or selected as a potential communication state 901. However, more generally, one or more potential communication states 901 can be determined based on one or more corresponding communication states respectively associated with one or more situations that are considered to be a match for a situation represented by the context 905.

In this way, the communication manager 900 can determine one or more potential states 901 for one or more first systems 902. Generally, a potential communication state can be used for communication activities associated with the one or more first systems 902. As such, the potential communication state, among other tings, can be used to initiate and negotiate communications between two systems. In particular, the communication managing 900 can be adapted to effectively provide a potential communication state associated with one system to another system. By way of example, the communication managing 900 can provide the one or more second systems 904 with one or more potential communication states 901 associated with one or more first systems 902 and/or vice versa. The communication managing 900 can present the one or more potential communication states 901 to one or more systems (e.g., a system 904) as one or more first acceptable communication states that are acceptable for communication by one or more other systems (e.g., a system 902). Furthermore, the communication managing 900 can be adapted to obtain one or more first acceptable communication states that are acceptable by one or more first systems 902 and one or more second acceptable communication states that are acceptable by one or more second systems 904 and effectively negotiate a mutually acceptable communication state that is acceptable to both the first and second systems 902 and 904. It should be noted that both first acceptable communication states can be determined based on integrated communication state and contextual usage data 814 and/or situational pattern of communication use data 818. It should be noted that the communication managing 900 can be adapted to determine both of the first and second acceptable communication states and/or receive one or both of the first and second acceptable communication states. As such, the communication managing system 900 can, for example, be adapted to act as a communication initiator and/or receiver operating respectively on sender (or transmitter) and receiver systems, or act in such capacity, as discussed in greater detail below.

Figure 9B:
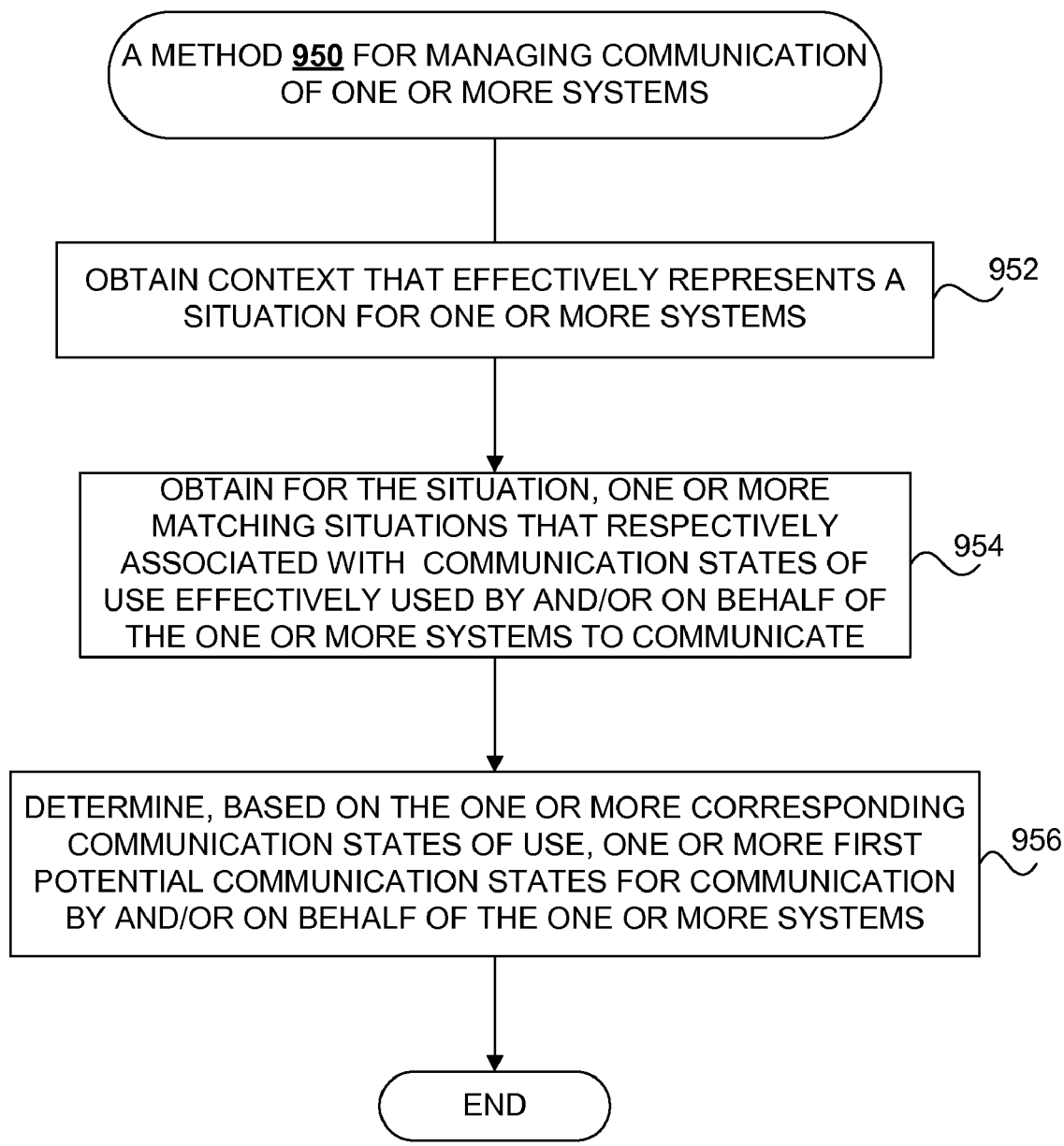
FIG. 9B depicts a method for managing the communication of one or more systems in accordance with one embodiment of the invention.

FIG. 9B depicts a method 950 for managing the communication of one or more systems in accordance with one embodiment of the invention. The method 950 can, for example, be used by the communication managing system 900 to manage the communication activities associated with one or more first and/or second systems 902 and 904. Referring to FIG. 9B, initially, obtain context that effectively represents a situation for one or more systems is obtained (952). Next, one or more situations that are considered to be a match for the situation (matching situations) are obtained (954). Typically, a matching situation represents and identified and/or known situations associated with more corresponding communication states of use effectively used by and/or on behalf the one or more systems to communicate. Accordingly, one or more potential communication states for communication by and/or on behalf of the system(s) can be determined (956) based on one or more communication states associated with one or more situations that match the situation represented by the context (matching situations). The method 950 ends after the one or more potential communication states are determined (956).

Figure 10A:
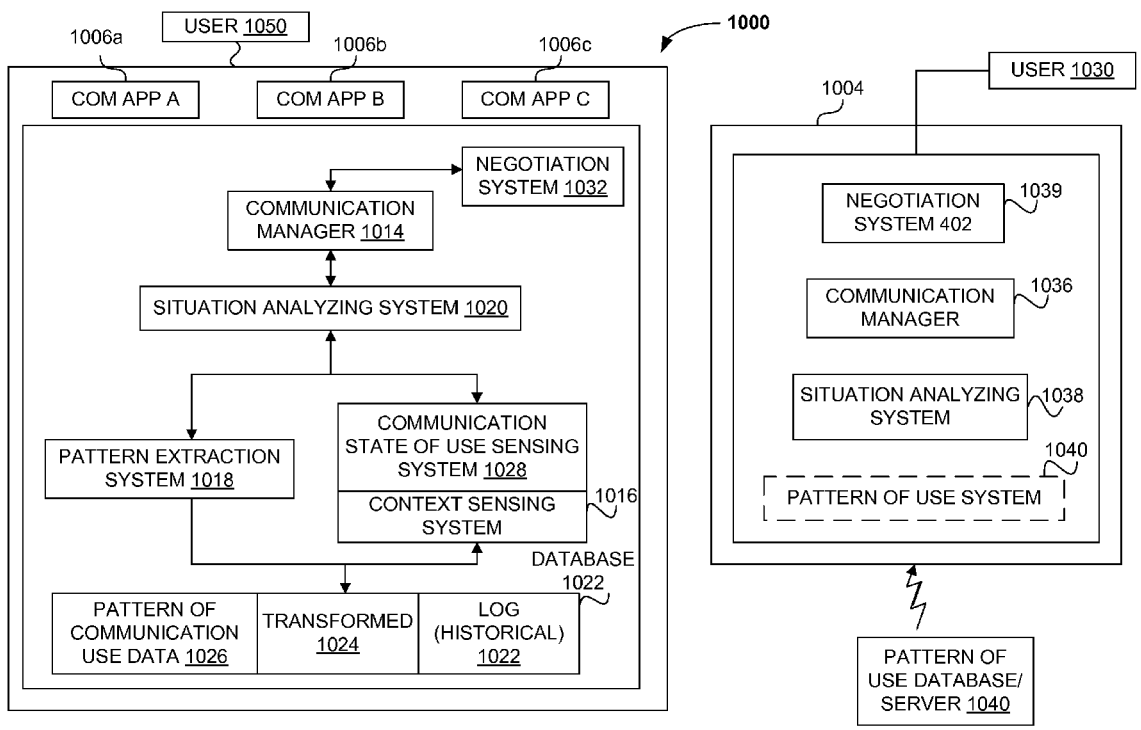
FIG. 10A depicts a communication systems environment adapted to act as a communication initiator and/or receiver operating respectively on sender (or transmitter) and receiver systems, or act in such capacity in accordance with the invention.

As noted above a communication managing system can be provided as an integral part of a communication system (e.g., a communication device). To further elaborate, FIG. 10A depicts a communication systems environment 1000 adapted to act as a communication initiator and/or receiver operating respectively on sender (or transmitter) and receiver systems, or act in such capacity in accordance with the invention. To further elaborate, FIG. 10A depicts two communication systems 1002 and 1004 in accordance with the embodiments of the invention. Referring to FIG. 10A, a first communication system 1002 can effectively support one or more communication applications and/or tasks 1006. Those skilled in the art will readily appreciate that a communication application and/or task 1006 can effectively use one or more communication protocols. Although not shown in FIG. 10A, a second communication system 1002 can similarly support one or more communication applications and/or tasks associated using one or more communication protocols. Generally, one or more communication applications and/or tasks 1002 on the first communication system 1002 can be effectively used to communicate with the second communication system 1004 via one or more communication applications and/or tasks being executed on the second communication system 1004.

In the described embodiment, the first communication system 1002 can initiate communication with the second communication system 1004. A communication request can, for example, be initiated by a user 1010 of the communication system 1002 (e.g., a person or an application program can request communication with the second communication device 1004). The request for communication can be received and processed by a communication manager component 1014 of the communication managing system 1012 provided for the first communication system 1002. In response to the request for communication, one or more potential communication states can be obtained for the current situation of the first communication system 1002. It will be appreciated that the one or more potential communication states can represent the communication preferences of the user 1010 at the time the request for communication is made (e.g., communication preferences of a person can be determined when the person requests communication to another device and/or person). As such, the communication manager 1014 can be adapted to interface with the context sensing system and pattern extraction system 1018 directly and/or indirectly via the situation analyzer system 1020 in order to obtain one or more potential communication states associated with the situation in which the request for communication is received. More particularly, the context sending system 106 can determine the current context representing the current situation of the device when the request for communication is received. The situation analyzing system 1020 can be adapted to determine one or more matching situations for the current situation determined by the context sensing system 1016. It should be noted that the one or more matching situations are respectively associated with one or more corresponding communication states of use effectively used by the first communication system 1002 to communicate with the second communication system 1004 and/or one or more other systems (not shown). The one or more matching situations can be obtained from a 1020 that can include log (historical) data 1022, transformed data 1024 and pattern of communication use data 1026. The information can log (historical) data 1022 can be effectively gathered by the communication state of use sensing system 1028 and context sending system 106 in a similar manner as discussed above with respect to state of use sensor 202 and contextual usage sensor 204 depicted in FIG. 2A. The information can log (historical) data 1022 can also be transformed to the transformed data 1024 which is in a form ready for pattern extraction, for example, using a transformer 216 depicted in FIG. 2A (not shown in FIG. 10A). The pattern extraction system 1018 can extracts patterns associated with communication use of the first communication system 1002 from the transformed data 1024 and store them in the database 1022 as pattern of communication use data 1026. The pattern of communication use data 1026 allows the situation analyzing system 1020 to determine (e.g., identify) a known situation that is considered to be a matching situation for the situation associated with the request for communication (e.g., a known situation that matches the current situation of the communication). A matching situation has an associated (or corresponding) communication state of use that can be identified as potential communication state for the first communication system 1002 when the request for communication with the second communication system 1004 is received. The potential communication state can be determined based on the patterns of communication use associated with the user 1010. As such, the potential communication state can represent the preference of the user 1010 in the same or similar situations as the situation when the request for communication is made. Accordingly, the preference of the user 1010 can be determined without requiring input from the user 1010. Furthermore, these preferences can be presented to the second communication system 1004 in an effort to negotiate a communication state that is mutually agreeable and/or preferred by the user 1010 and another user 1030.

More particularly, a first negotiation system 1032 on the first communication system 1002 can effectively negotiate a mutually agreeable state of communication with a second negotiation system 1034 on the first communication system 1004. To further elaborate, the first negotiation system 1032 can effectively present at least one potential communication state to the second negotiation system as at least one acceptable communication state as a part of a communication initiation and/or negotiation phase. The second negotiation system 1032 can effectively present the first negotiation system 1032 with its acceptable communication state(s). It should be noted that the one or more acceptable communication states associated with the second communication system 1004 can be determined based on patterns of communication use associated with the second user 1030 in a similar manner as described above. Referring to FIG. 10A, the second communication device 1004 can be provided with second communication manger and situation analyzing system 1036 and 1038. In addition, a pattern of use system 1040 can be provided for the second communication system 1004. The pattern of use system 1040 can, for example, have one or more components depicted for the first communication system 1002 or merely be adapted to receive information pertaining to pattern of use and/or context (or situation) associated with the communication system 1002 from another source (e.g., a pattern of use database and/or server 1040).

In any case, the first and second negotiation systems 1030 and 1034 can attempt to negotiate a mutually acceptable (or agreeable) state of communication. This means that each of the first and second negotiation systems 1030 and 1034 can, for example, compare potential communication states of their own systems with acceptable communication states associated with other systems and identify at least one mutually acceptable communication state for communication between the two communication systems 1002 and 1004. Furthermore, potential communication states, mutually acceptable communication states, or lack thereof can be effectively communicated to the users 1010 and 1030 by the communication managers 1014 and 1036. The potential communication states and/or mutually acceptable communication states can, for example, be recommended, suggested, made accessible, made more acceptable, and/or initiated, thereby allowing the users 1010 and 1030 to conveniently communicate in the manner that is mutually preferred and/or more suitable considering their respective preferences and/or habits without requiring any feedback (e.g., supervised training) from them. However, it will be appreciated that whether a potential or recommended state of communication is actually used in a situation can be stored and used to improve the patterns of communication use in order to make more accurate predictions regarding communication use.

Figure 10B:
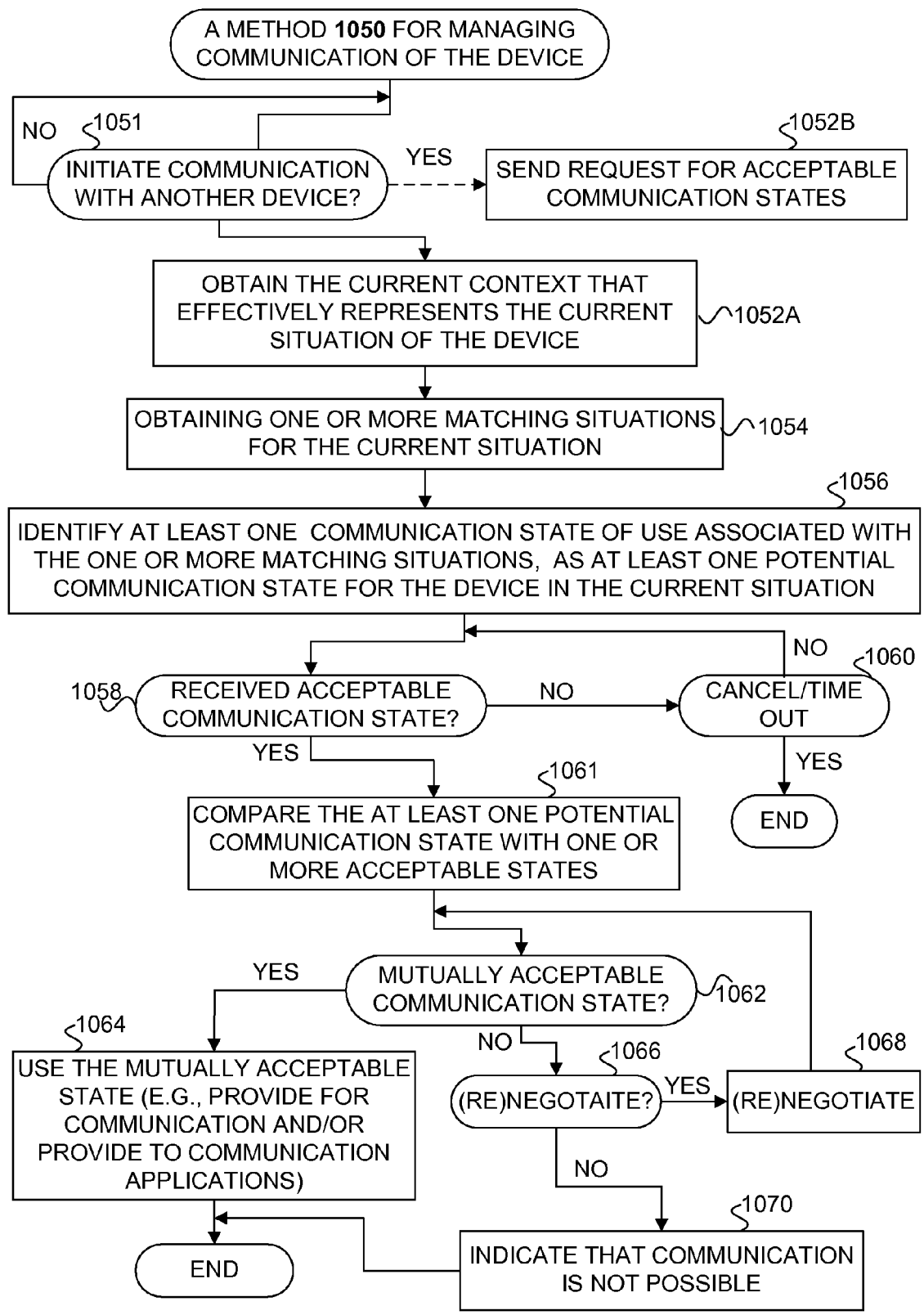
FIG. 10B depicts a method for managing communications of a device in accordance with one embodiment of the invention.

FIG. 10B depicts a method 1050 for managing communications of a device in accordance with one embodiment of the invention. The method 1050 can, for example, be performed by the communication system 1004. Referring to FIG. 10B, initially, it is determined (1051) whether to initiate communication with another device. Typically, communication with another device is initiated by a user of the device (e.g., a person can request communication). In effect, the method 1050 can wait for communication to be initiated. If it is determined (1051) to initiate communication with another device, the current context for the device is obtained (1052A). It should be noted that a request for communication can be sent (1052B) to another device. This request can effectively solicit the communication states that are acceptable to the other device (acceptable communication states).

After the current context representing the current situation for the device is obtained (1052A), one or more matching situations are obtained (1054) for the current situation. Next, at least one communication state of use associated with the one or more matching situations is identified (1056). The at least one communication state represents a potential communication state for communication in the current situation. Thereafter, it is determined (1058) whether one or more acceptable communication states of the other device is received. In other words, it is determined (1058) whether the other device has effectively provide one or more communication states that it deems acceptable for communication. In effect, the method 1050 can wait to receive at least one acceptable communication state from the other device or end as a result of a time out and/or cancelation (1060).

If it is determined (1058) that the at least one acceptable communication state is received from the other device, the at least one potential communication sate determined for the device is compared with the one or more acceptable communication states of the other device (1060). Accordingly, it is determined (1062) whether a mutually acceptable communication state exists between the two devices. As such, if it is determined (1062) that at least one mutually acceptable communication state exists between the two devices, the mutually acceptable communication state is used (1064) for communication. By way of example, the mutually acceptable communication state can be provided to one or more communication tasks and/or applications executing on the device. The method 1050 can end after the mutually acceptable communication state is used (1064). However, if it is determined (1062) that the mutually acceptable communication state does not exist between the two devices, an attempt (1066) can be made to negotiate (or renegotiate) the mutually acceptable communication state. As such, the mutually acceptable communication state can be negotiated or renegotiated (1068) or an indication can be made (1070) that communication is not possible before the method 1050 ends.

Figure 10C:
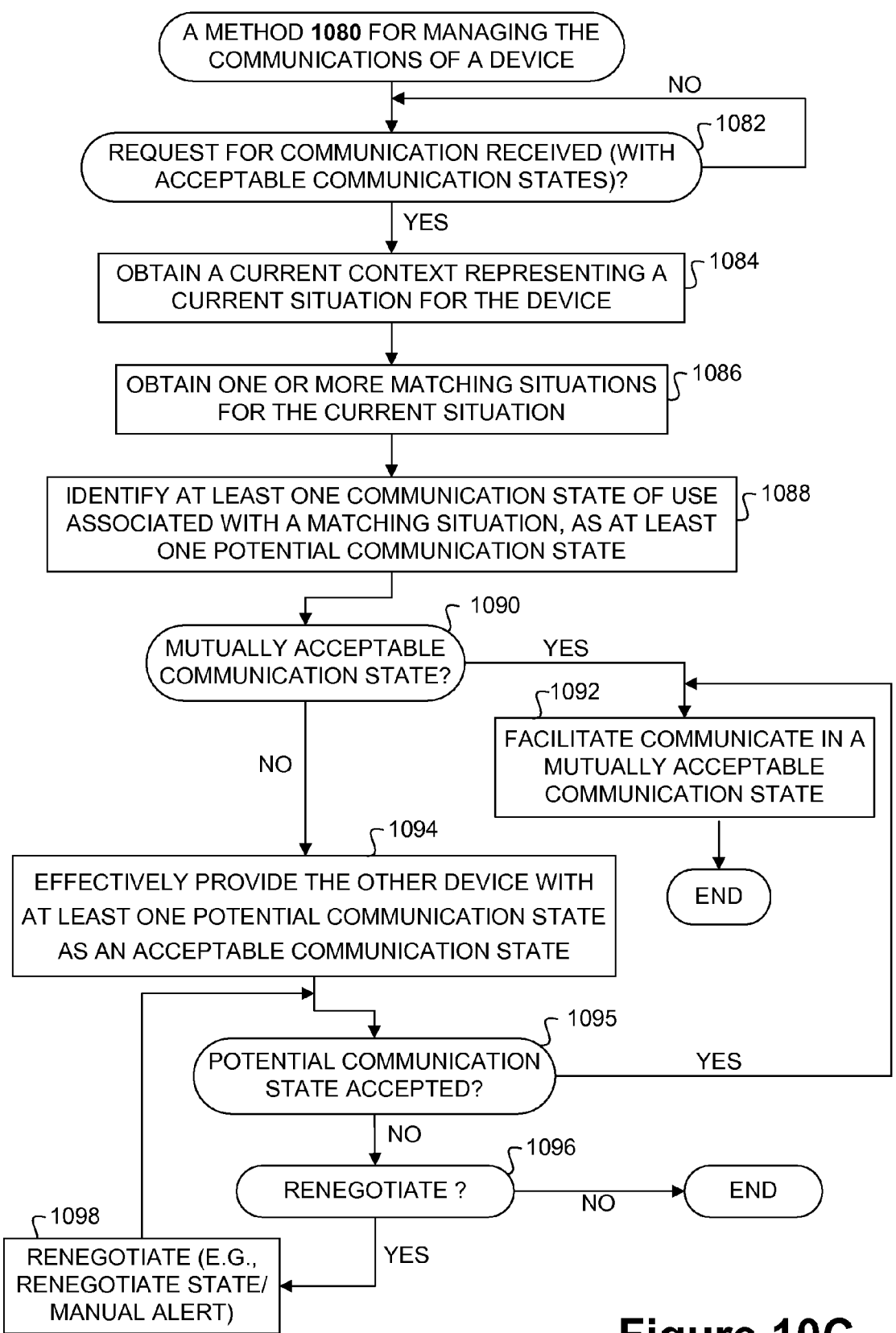
FIG. 10C depicts a method for managing the communication of a device in accordance with another embodiment of the invention.

FIG. 10C depicts a method 1080 for managing the communication of a device in accordance with another embodiment of the invention. The method 1080 can, for example, be performed by the communication system 1004 depicted in FIG. 10A. Referring to FIG. 10C, initially, it is determined (1082) whether a request for communication is received. Typically, the request for communication is initiated by and/or on behalf of another device in order to communicate with the device. In effect, the method 1080 can wait to receive a request for communication from another device. It should be noted that the request for communication can be effectively accompanied by one or more acceptable communication states which represent the communication states that are acceptable by the device initiating the communication request or one or more acceptable communication states can be provided at a later time. In any case, if it is determined (1082) that the request for communication has been received, the current context representing the current situation for the device is obtained (1084). Next, one or more matching situations are obtained (1086) for the current situation represented by the current context of the device. As noted above, the one or more matching situations are associated respectively with one or more corresponding communication states of use. Accordingly, at least one communication state of use associated with the matching situation is identified (1088). This communication state of use represents a potential communication state for the device and can be effectively compared to the acceptable communication states representing one or more communication states of the device, requesting communication. Accordingly, it is determined (1090) whether a mutually acceptable communication state exists between the two devices and communication in a mutually communication state can be facilitated (1092) before the method 1080 ends. However, if it is determined (1090) that a mutually acceptable communication state does not exist, at least one potential communication state can be effectively provided (1094) to the other device as an alternative acceptable communication state for the device in order to effectively attempt to negotiate or renegotiate a mutually acceptable communication state. Thereafter, it can be determined (1095) whether a potential communication state has been accepted for the other device so that communication can be facilitated (1092) in a mutually acceptable communication state accordingly. Otherwise, a mutually acceptable communication state can be effectively renegotiated (1095) and (1096) in order to determine a mutually acceptable communication state. By way of example, a manual alert can be provided to the users and/or one or more rules can be used in order to ultimately negotiate a mutually acceptable communication state. However, if a mutually acceptable communication state cannot be negotiated, the method 1080 ends without facilitating communication between the devices.

Figure 11:
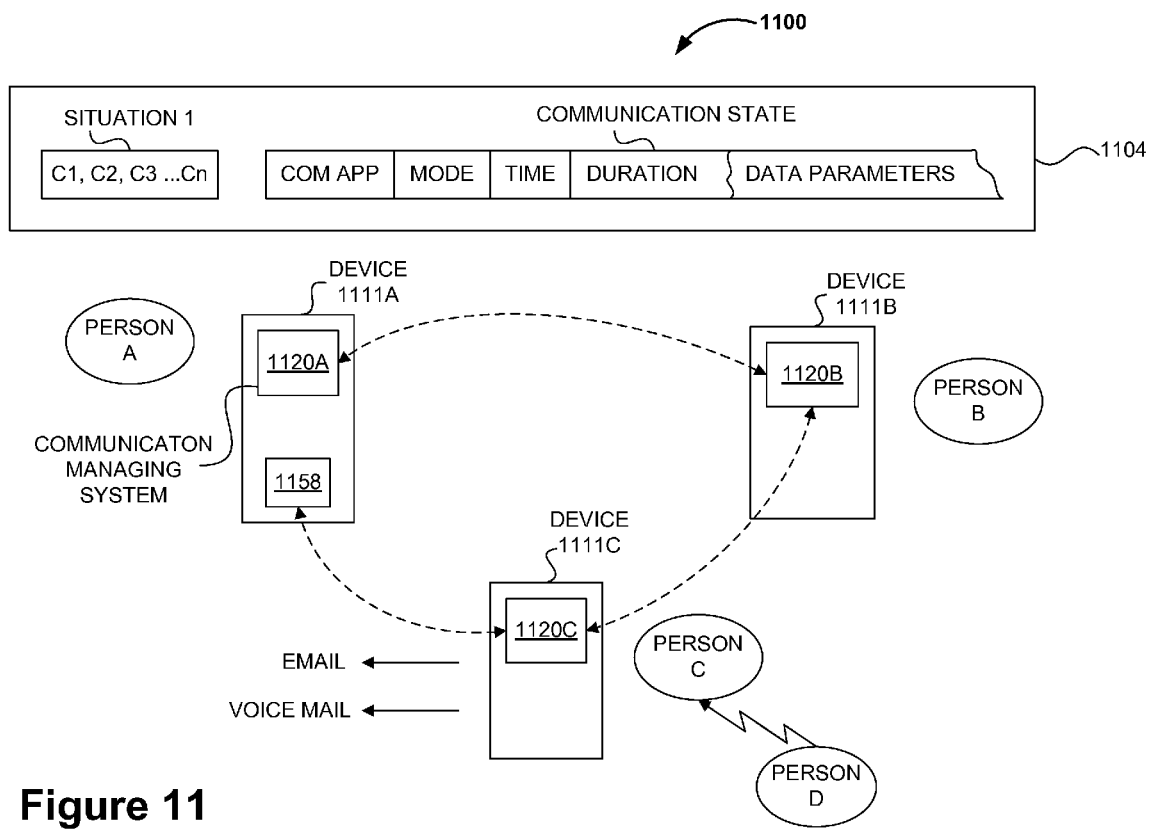
FIG. 11 depicts a communication environment in accordance with one embodiment of the invention.

To elaborate even further, FIG. 11 depicts a communication environment 1100 in accordance with one embodiment of the invention. Referring to FIG. 11, three (3) communication devices 1111A, 111B and 111C are depicted respectively for there persons A, B and C. In addition, simplified pattern of communication use data 1104 represents state of communication data including various parameters (or variables) associated with communication application, mode, time, duration, and data parameters (e.g., type or size of data communicated) which are associated with a situation represented by one or more context variables ($C_1, \ldots C_n$) which can, for example, represent various environmental variables as well as the state of on or more applications as discussed in greater detail above. Referring to FIG. 11, the person A can, for example, request communication to persons B and C either explicitly or just by selecting a recommendation option. In response, a communication managing system 1120A can effectively determine based on the pattern of communication use data associated with person A that this is a first Monday of the month afternoon at work when a person A usually has a telephone conference with persons B and C. As such, the communication managing system 1120A can effectively contact the communication mangers 1120B and 1120C respectively provided on the communication devices 111B and 111C in order to determine whether persons B and C are in a situation that allows a conference call to be made. Similarly, the communication mangers 1120B can recognize the situation and respond that a telephone conference is acceptable and/or preferred by the user B. If the communication manager 1120B finds a similar situation where a telephone conference is acceptable and/or preferred by the user B, a conference call recommendation can be made to the person A and/or automatically initiated by the communication managers 1120A and accepted by the communication managers 1120B and 1120C.

However, assuming that the person C is somehow otherwise engaged with a person D identified by the communication manager 1120C, the communication manager 1120C can effectively negotiate a different mode of communication. For example, the communication manager 1120C can recognize person D as supervisor and the situation as important discussion where no interruptions should be made. As such, the communication manager 1120C can effectively present the device 111A and/or device 111B with an alternative mode of communication in the order preferred in this situation, namely, voice mail as the first option and email as the second option. Similarly, the communication managers 1120A and 1120B can identify alternative ways of communication that may be acceptable and accept the options offered by the communication manager 1120C or present alternatives ways to communicate.

It should be noted that pattern of communication use data 1104 and/or a set of rules or preferences 1158 can be used to make very complex decisions regarding both the determination of preferences of a user and negotiating a mutually agreeable communication state. By way of example, the communication manager 1120A can determine the general preference of the user C in a particular situation is to accept a phone call if it can be completed within 5 minutes, but it can further be determined that the average amount of time spent on the phone with the person B who initiated the call is over 10 minutes so voice mail and/or email can be offered as the most preferred modes of communication to the person B. In addition, the set of rules 1120 can effectively be used in combination with pattern of communication use data and/or as an override in order to manage the communication activities. By way of example, a simple rule may effective state that all communication requests from a particular person should be accepted regardless of the situation. As another example, a more complex rule may effectively be defined based on predictability of the situation and/or other variables that can be extracted from the logged (or historical) data. Communication applications and/or tasks can, for example, be associated with one or more of the following: electronic mail (email), phone call, text messaging, voice mail, facsimile, video conferencing, phone conferencing, video, text, and graphics.

Figure 12A:
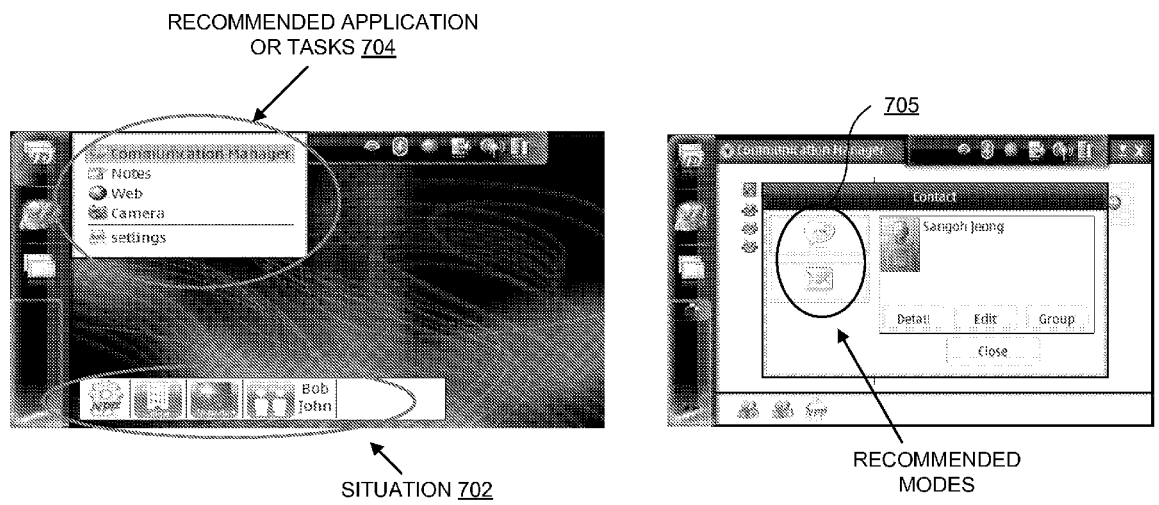
FIGS. 12A and 12B depict screenshots representing simple exemplary situations in accordance with the invention.
Figure 12B:
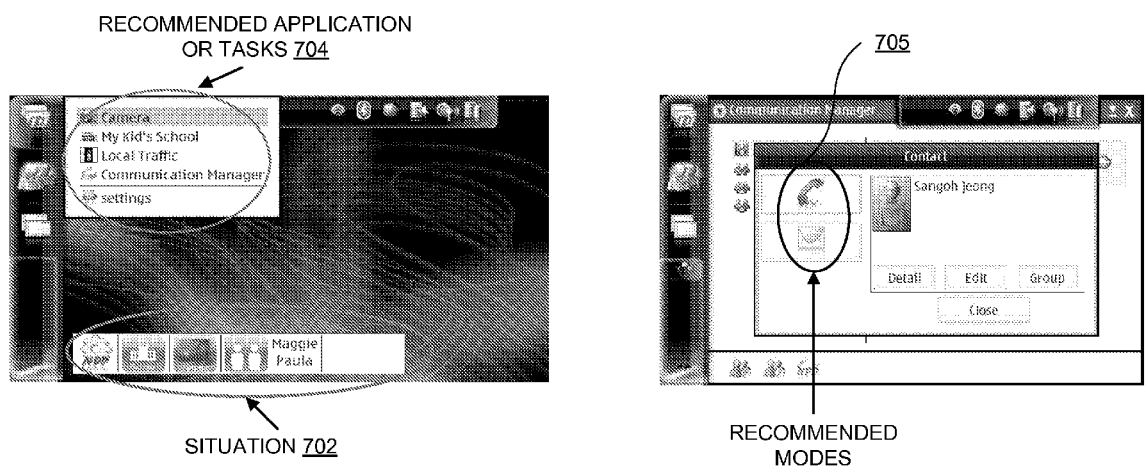

To further demonstrate recommending communication applications (or tasks) based on situations, FIGS. 12A and 12B depict screenshots representing simple exemplary situations in accordance with one embodiment the invention. Referring to FIG. 12A, an "office meeting in the afternoon" is depicted using only three (3) simple context variables, namely, time, location, and co-locator information. The applet 702 shows the context of the current situation: "office", "afternoon", and with co-locators identifying two coworkers as "Bob" and "John". In this situation which represents an office meeting in the afternoon, a pull-down menu 704 shows that recommended applications or tasks: communication, notes, Web, and camera. The recommendations effectively reflects the behavior of the person using the device, namely, that the person often takes notes, snapshot pictures, and browses the Web during office meetings in the afternoon. FIG. 12A shows the recommended communication modes 705 when a human user (a person) selects a contact for communication. After effectively considering the preferences of both parties in their respective situations, the text messaging and email can be recommended since one of the parties is in a meeting.

In contrast to FIG. 12A, FIG. 12B depicts a screen shot representing a different situation, namely, "picking up kids at the evening" in accordance with one embodiment of the invention. Referring to FIG. 12B, the applet 702 now shows "school," "evening," and "Maggie" and "Paula." As a result, "camera," "kid school Web site," and "local traffic service" are recommended as preferred applications or tasks 704 in this situation when a person is picking up the kids at the evening rather then attending a meeting in the office in the afternoon. The right screenshot (705) shows that in this situation the most preferable mode of communication is "call," in contrast to the situation depicted in FIG. 12A.

In view of the foregoing, it will readily be appreciated that the invention is especially useful for mobile devices even though the techniques described above can be applied to any system as the techniques have been described for general systems without making any assumptions or requiring specific features to be provided. By way of example, the techniques of the invention can be used to configure a mobile phone to automatically recommend or make accessible various communication applications and/or tasks by detecting the current situation of the mobile phone.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A communication managing system for managing communications associated with one or more systems, said communication managing system comprising at least one hardware processor configured for:

obtaining a first context for one or more first systems, wherein said first context can effectively represent a first situation for said one or more first systems;

obtaining one or more matching situations for said first situation wherein said matching situations are determined based at least on a situational pattern of use and wherein said one or more matching situations are respectively associated with one or more corresponding communication states of use effectively used by and/or on behalf of said one or more first systems to communicate; and determining, based on said one or more corresponding communication states of use, one or more first potential communication states for communication by and/or on behalf of said one or more first systems;

the system including a pattern sensing system detecting patterns in a state of use of application programs used by a user associated with communicating information and a context use of application and based on at least one of internal components and external components of a computing system;

the system providing recommendations for selecting the potential communication state associated with the matching situation.

2. The communication managing system of claim 1, wherein said determining of said one or more first potential communication states comprises: identifying and/or selecting at least one of said one or more corresponding communication states of use as at least one potential communication state for communication by and/or on behalf of said one or more first systems.

3. The communication managing system of claim 1, wherein said previous matching situations include integrated state and contextual usage data.

4. The communication managing system of claim 1, wherein said communication managing system includes a pattern sensing system, a state of use sensor, and a context use sensor, the pattern sensing system detecting patterns in a state of use of application programs used by a user and a context use based on at least one of internal components and external components of a computing system, and the communication managing system is further adapted for and/or capable of:

suggesting, recommending, making accessible, making more accessible, and/or initiating said first one or more potential communication states for communication by and/or on behalf of said one or more first systems.

5. The communication managing system of claim 1, wherein said communication managing system is further adapted for and/or capable of:

effectively providing said one or more first systems and/or one or more second systems with said one or more first potential communication states as one or more first acceptable communication states that are acceptable for communication.

6. The communication managing system of claim 5, wherein said communication managing system is further adapted for and/or capable of:

obtaining one or more second acceptable communication states that are acceptable by one or more second systems for communication; and negotiating, based on said first and second one or more acceptable communication states, a mutually acceptable communication state acceptable by both of said first and second systems for communication.

7. The communication managing system of claim 5, wherein said communication managing system is further adapted for and/or capable of:

effectively providing said one or more second systems with said one or more first potential communication states as one or more first acceptable communication states that are acceptable by said one or more first systems for communication;

receiving one or more second acceptable communication states that are acceptable by said one or more second systems for communication with said one or more second systems; and determining, based on said first and second acceptable communication states, whether said first and second systems are to communicate with each other.

8. The communication managing system of claim 7, wherein said communication managing system is further adapted for and/or capable of:

selecting and/or identifying a mutually acceptable communication state from said first and second acceptable communication states, wherein said mutually acceptable communication state is acceptable by both of said first and second systems for communication.

9. The communication managing system of claim 7, wherein said communication managing system is further adapted for and/or capable of:

recommending, suggesting, making accessible, making more accessible and/or initiating said mutually acceptable communication state to and/or for said one or more first systems and/or one or more second systems.

10. The communication managing system of claim 5, wherein said one or more second acceptable communication states that are acceptable by said one or more second systems represent one or more second potential communication states for said one or more second systems, and wherein said one or more second potential communication states are determined based on one or more second corresponding communication states of use used by and/or on behalf of said one or more second systems to communicate.

11. The communication managing system of claim 5, wherein said providing of said first acceptable communication states comprises one or more of the following:

transmitting said first acceptable communication states to said one or more second systems and/or one or more of their agents;

transmitting said first acceptable communication states in a secure manner to said one or more second systems and/or one or more of their agents;

encrypting said one or more first acceptable communication states; and transmitting said one or more first acceptable communication states in an encrypted form to said one or more second systems and/or one or more of their agents.

12. The communication managing system of claim 1, wherein said communication state of use includes one or more of the following:

one or more communication applications, tasks, and/or services, the state of one or more communication applications, tasks, and/or services, one or more modes of communications, one or more communication protocols, one or more modes and/or protocols of communication used by one or more communication applications and/or tasks, manner of use of one or more communication applications and/or tasks, one or more parameters used for and/or by one or more communication applications, one or more parameters associated with initiation, use and/or completion of one or more communication applications, tasks and/or services.

13. The communication managing system of claim 12, wherein said communication state of use further includes one or more of the following:

time and/or duration of communication associated with one or more communication applications, tasks and/or services;

data received and/or transmitted by one or more communication applications, tasks and/or services;

type, size and/or content of data received and/or transmitted by one or more communication applications, tasks and/or services; and one or more senders, recipients, agents, persons, groups, and entities associated with one or more communication applications, tasks and/or services.

14. The communication managing system of claim 1, wherein said one or more first systems include one or more of the followings:

one or more communication systems, one or more networks, one or more communication devices, one or more devices, one or more mobile phones, one or more Smartphones, one or more computing systems, one or more laptop computers, one or more desktop personal computers, one or more servers, one or more digital personal assistants.

15. The communication managing system of claim 1, wherein said communication managing system includes and/or is provided as an integral part of one or more of the followings:

one or more communication systems, one or more communication devices, one or more devices, one or more mobile phones, one or more Smartphones, one or more computing systems, one or more laptop computers, one or more personal computers, and one or more digital personal assistants.

16. The communication managing system of claim 1, wherein said obtaining of said first context and/or obtaining of said one or more matching situations comprise: receiving, determining, identifying and/or selecting of said first context and/or obtaining of said one or more matching situations.

17. A device, comprising one or more processors for:

obtaining a current context for said device, wherein said current context can effectively represent a current situation for said device;

obtaining one or more matching situations for said current situation based on at least on a situational pattern of use of data by a user, wherein said one or more matching situations are respectively associated with one or more corresponding communication states of use effectively used by said device to communicate with one or more other devices;

identifying at least one of said one or more corresponding communication states of use as at least one potential communication state for communication by said device in said current situation;

receive at least one acceptable communication state representing at least one communication state of use that is acceptable by at least one other device;

compare said at least one potential communication state with said at least one acceptable communication state to determine whether at least one mutually acceptable communication state exists that is acceptable by said device and said at least one other device; and identify said at least one mutually acceptable communication state for communication between said device and said at least one other device when said determining determines that said at least one mutually acceptable communication state exists;

the device including a pattern sensing system detecting patterns in a state of use of application programs used by a user associated with communicating information and a context use of application and based on at least one of internal components and external components of a computing system;

the device providing recommendations for selecting the potential communication state associated with the matching situation.

18. The device of claim 17, wherein said device is further adapted for and/or capable of: recommending, suggesting, making accessible, making more acceptable, and/or initiating said mutually acceptable state of communication for communication.

19. The device of claim 17, wherein said device is further adapted for and/or capable of
receiving a request to communicate with said one or more other devices; and
determining said current context when said request to communicate is received.

20. The device of claim 17,
wherein said communication state of use includes one or more communication applications, tasks and/or services, and
wherein said device is further adapted for and/or capable of:
recommending, suggesting, making accessible, making more acceptable, initiating said one or more communication applications and/or tasks as one or more mutually acceptable communication applications and/or tasks for communication between said device and said other at least one device.

21. The device of claim 20, wherein said communication applications and/or tasks are associated with one or more of the following:
electronic mail (email), phone call, text messaging, voice mail, facsimile, video conferencing, phone conferencing, video, text, and/or graphics.

22. The device of claim 17 wherein said matching situation is further based on integrated state and contextual usage data.

23. A device, comprising one or more processors for:
receiving a request for communication initiated by one or more other devices;
obtaining a current context for said device when said request for communication is received, wherein said current context can effectively represent a current situation for said device;
obtaining one or more matching situations for said current situation based on at least on a situational pattern of use of data by a user, wherein said one or more matching situations are respectively associated with one or more corresponding communication states of use effectively used by said device to communicate;
identifying at least one of said one or more corresponding communication states of use as at least one potential communication state for communication by said device in said current situation; and
effectively providing said one or more other devices and/or their agents with said at least one potential communication state as at least one first acceptable communication state that is acceptable for communication by said device for communication with said one or more other devices;
the device including a pattern sensing system detecting patterns in a state of use of application programs used by a user associated with communicating information and a context use of application and based on at least one of internal components and external components of a computing system;
the device providing recommendations for selecting the potential communication state associated with the matching situation.

24. A method for managing communications of a device including a hardware processor, said method comprising:
obtaining a current context for said device, wherein said current context can effectively represent a current situation for said device;
obtaining one or more matching situations for said current situation based on at least on a situational pattern of use of data by a user, wherein said one or more matching situations are respectively associated with one or more corresponding communication states of use effectively used by said device to communicate with one or more other devices;
identifying at least one of said one or more corresponding communication states of use as at least one potential communication state for communication by said device in said current situation;
receiving at least one acceptable communication state representing at least one communication state of use that is acceptable by at least one other;
comparing said at least one potential communication state with said at least one acceptable communication state to determine whether at least one mutually acceptable communication state exists that is acceptable by both of said device and said at least one other device; and
identifying said at least one mutually acceptable communication state for communication between said device and said at least one other device when said determining determines that said at least one mutually acceptable communication state exists;
the method further comprising:
detecting patterns in a state of use of application programs used by a user associated with communicating information and a context use of application and based on at least one of internal components and external components of a computing system; and
providing recommendations for selecting the potential communication state associated with the matching situation.

25. The method of claim 24, wherein said method further comprises:
receiving at least one other potential communication state as at least one acceptable communication state acceptable by said at least one other device for communication with said device;
determining, based on said at least one other potential communication state, at least one mutually acceptable communication state that is acceptable by said device and said at least one other device for communicating with each other.

26. The method of claim 24 wherein said matching situation is further based on integrated state and contextual usage data.

27. A method for managing communications of one or more systems including a hardware processor, said method comprises:
obtaining a first context for said one or more first systems, wherein said first context can effectively represent a first situation for said one or more first systems;
obtaining one or more matching situations for said current situation based on at least on a situational pattern of use of data by a user, wherein said one or more matching situations are respectively associated with one or more corresponding communication states of use effectively used by and/or on behalf of said one or more first systems to communicate; and
determining, based on said one or more corresponding communication states of use, one or more first potential communication states for communication by and/or on behalf of said one or more first systems;

the method further comprising:
  detecting patterns in a state of use of application programs used by a user associated with communicating information and a context use of application and based on at least one of internal components and external components of a computing system; and
  providing recommendations for selecting the potential communication state associated with the matching situation.

28. The method of claim 27 wherein said matching situation is further based on integrated state and contextual usage data.

29. A method for managing communications of a device, said method comprising:
  receiving a request for communication initiated by at least one other device;
  obtaining a current context for said device when said request for communication is received, wherein said current context can effectively represent a current situation for said device;
  obtaining one or more matching situations for said current situation based on at least on a situational pattern of use of data by a user, wherein said one or more matching situations are respectively associated with one or more corresponding communication states of use effectively used by said device to communicate;
  identifying at least one of said one or more corresponding communication states of use as at least one potential communication state for communication by said device in said current situation; and
  effectively providing said other device and/or its agent with said at least one potential communication state as at least one first acceptable communication state that is acceptable by said device for communication with said at least one other device;
  the method further comprising:
  detecting patterns in a state of use of application programs used by a user associated with communicating information and a context use of application and based on at least one of internal components and external components of a computing system; and
  providing recommendations for selecting the potential communication state associated with the matching situation.

30. The method of claim 29, wherein said method further comprises:
  receiving one or more other acceptable communications states of use from said at least one other device as one or more other communication states that are acceptable for communication by said at least one other device; and
  determining based on said least one potential communication state and one or more other acceptable communications states whether to communicate with said at least one other device.

31. The method as recited in claim 30, wherein said method further comprises:
  selecting said least one potential communication state as a mutually acceptable communication state that is acceptable for communication by said device and said at least one other device when said determining determines to communicate.

32. A non-transitory computer readable medium including computer program code for managing communications of one or more systems, said computer readable medium comprises:
  computer program code for obtaining a first context for said one or more first systems, wherein said first context can effectively represent a first situation for said one or more first systems;
  computer program code for obtaining one or more matching situations for said first situation based on at least on a situational pattern of use of data by a user, wherein said one or more matching situations are respectively associated with one or more corresponding communication states of use effectively used by and/or on behalf of said one or more first systems to communicate;
  computer program code for determining, based on said one or more corresponding communication states of use, one or more first potential communication states for communication by and/or on behalf of said one or more first systems;
  computer program code for detecting patterns in a state of use of application programs used by a user associated with communicating information and a context use of application and based on at least one of internal components and external components of a computing system; and
  computer program code for providing recommendations for selecting the potential communication state associated with the matching situation.

33. The non-transitory computer readable medium of claim 32 wherein said matching situation is further based on integrated state and contextual usage data.

* * * * *